US011869430B2

(12) United States Patent
Sakakibara

(10) Patent No.: US 11,869,430 B2
(45) Date of Patent: Jan. 9, 2024

(54) DISPLAY AND DISPLAY DRIVING METHOD

(71) Applicant: SHARP KABUSHIKI KAISHA, Sakai (JP)

(72) Inventor: Yusuke Sakakibara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/792,334

(22) PCT Filed: Jan. 24, 2020

(86) PCT No.: PCT/JP2020/002473
§ 371 (c)(1),
(2) Date: Jul. 12, 2022

(87) PCT Pub. No.: WO2021/149237
PCT Pub. Date: Jul. 29, 2021

(65) Prior Publication Data
US 2023/0055388 A1 Feb. 23, 2023

(51) Int. Cl.
*G09G 3/3233* (2016.01)

(52) U.S. Cl.
CPC ..... *G09G 3/3233* (2013.01); *G09G 2310/027* (2013.01); *G09G 2320/0233* (2013.01); *G09G 2330/021* (2013.01)

(58) Field of Classification Search
CPC ........... G09G 3/3233; G09G 2310/027; G09G 2320/0233; G09G 2330/021; G09G 3/2003; G09G 2300/0452; G09G 2360/16; G09G 3/3275
See application file for complete search history.

(56) References Cited

U.S. PATENT DOCUMENTS

| | | | | |
|---|---|---|---|---|
| 2003/0071804 | A1 | 4/2003 | Yamazaki et al. | |
| 2003/0222840 | A1* | 12/2003 | Koga | G09G 3/3607 345/89 |
| 2006/0103684 | A1 | 5/2006 | Yamazaki et al. | |
| 2006/0232534 | A1 | 10/2006 | Koga et al. | |
| 2010/0109992 | A1 | 5/2010 | Sumi et al. | |
| 2013/0127924 | A1* | 5/2013 | Lee | G09G 3/2025 345/82 |
| 2015/0145906 | A1 | 5/2015 | Uetake | |
| 2017/0186980 | A1* | 6/2017 | Watabe | H10K 85/636 |
| 2020/0403174 | A1* | 12/2020 | Kim | H10K 50/15 |

FOREIGN PATENT DOCUMENTS

| | | | |
|---|---|---|---|
| JP | 2003-177714 | A | 6/2003 |
| JP | 2003-308048 | A | 10/2003 |
| JP | 2010-107843 | A | 5/2010 |
| JP | 2015-102723 | A | 6/2015 |

* cited by examiner

*Primary Examiner* — Mihir K Rayan
(74) *Attorney, Agent, or Firm* — ScienBiziP, P.C.

(57) ABSTRACT

A pixel is divided into a first subpixel and a second subpixel. A first data signal is input to a first drive unit that drives a first light-emitting element constituting the first subpixel, and a second data signal is input to a second drive unit that drives a second light-emitting element constituting the second subpixel. A gray scale value of the first data signal is smaller than a gray scale value of the second data signal.

14 Claims, 19 Drawing Sheets

DISPLAY AND DISPLAY DRIVING METHOD

TECHNICAL FIELD

The disclosure relates to a display and a driving method of a display, and particularly relates to a display and a driving method of a display using quantum dot LEDs (QLEDs).

BACKGROUND ART

Quantum dot light-emitting diodes (QLEDs), along with organic light-emitting diodes (OLEDs), are advantageous in terms of power consumption, viewing angle characteristics, and color reproducibility compared to known liquid crystal display devices, and thus the market is gradually expanding.

In the OLED field, for example, as described in JP 2015-102723 A (published Jun. 4, 2015), technology development has been promoted to achieve more accurate display in a low gray scale region.

SUMMARY

As a result of diligent efforts, the inventors have discovered that an OLED and a QLED are significantly different in their element characteristics in a low current region, and the QLED has a problem unique to the QLED in the low current region, which is described below.

FIG. 19 is a diagram illustrating a relationship between a luminance L and a current density J of the QLED and the OLED.

As illustrated in FIG. 19, in the QLED, compared to the OLED, in the relationship between the luminance L and the current density J, in the low current region, the luminance L tends to form a curved line having a downward convex shape. In this manner, in the relationship between the luminance L and the current density J of the QLED and the OLED, the difference occurs in the low current region for the following reason.

In the OLED, a relationship between the current density J and a voltage V depends on Formula (A) described below due to a process of filling a carrier trap of an organic light-emitting layer. In other words, in the OLED, since the relationship between the current density J and the voltage V depends on Formula (A) described below, changes in the current density J (current) with respect to the voltage V are not sudden, and thus the relationship between the current density J and the luminance L is as illustrated in FIG. 19 in the low current region.

[Expression 1]

$$J \propto V^r (1 \leq r \leq 2) \qquad \text{FORMULA (A)}$$

In contrast to this, in the QLED, the relationship between the current density J and the voltage V depends on Formula (B) described below due to a p-n junction. Note that, in Formula (B) described below, $J_0$ and n are constants, e is an elementary charge, k is the Boltzmann's constant, and T is the temperature.

[Expression 2]

$$J \propto J_0[\exp(eV/nkT)-1] \qquad \text{FORMULA (B)}$$

As described above, in the QLED, since the relationship between the current density J and the voltage V depends on Formula (B) described above, changes in the current density J (current) with respect to the voltage V are more sudden than those of the OLED. Thus, in the low current region, changes in the proportion of carriers entering a non-light-emitting mode are also large, and in the QLED, as illustrated in FIG. 19, the relationship between the current density J and the luminance L tends to be represented by the line having the downward convex shape.

As described above, in the QLED, in the low current region, the relationship between the current density J and the luminance L tends to be represented by the line having the downward convex shape. Thus, as illustrated in FIG. 19, to obtain the same desired luminance L0 in the low current region of the OLED and the QLED, a larger current density (current) is required in the QLED compared to the OLED. Thus, in the case of the QLED, there is a problem that it is difficult to reduce power consumption in the low current region and achieve power consumption saving.

In light of the problem described above, an aspect of the disclosure is to provide a display and a driving method of a display capable of achieving power consumption saving, even when a light-emitting element is used in which a relationship between a current density and a luminance in a low current region is represented by a line having a downward convex shape.

In order to solve the problem described above, a driving method of a display according to an aspect of the disclosure is a driving method of a display including a first subpixel and a second subpixel constituting a pixel, a first light-emitting element constituting the first subpixel, a second light-emitting element constituting the second subpixel, a first drive unit configured to control a current density of a current flowing through the first light-emitting element, a second drive unit configured to control a current density of a current flowing through the second light-emitting element, and a controller configured to input a data signal to the first drive unit and the second drive unit. Each of the first light-emitting element and the second light-emitting element has element characteristics having, in a relationship between luminance and current density, a first region in which a luminance forms a downward convex shape. The controller causes a current of a first current density to flow into the first light-emitting element by inputting a data signal of a first gray scale value to the first drive unit and causes the first light-emitting element to emit light at a first luminance, and the controller causes a current of a second current density to flow into the second light-emitting element by inputting a data signal of a second gray scale value to the second drive unit and causes the second light-emitting element to emit light at a second luminance. When the first luminance and the second luminance are luminances included in the first region, the first gray scale value is smaller than the second gray scale value.

In order to solve the problem described above, a display according to an aspect of the disclosure includes a first subpixel and a second subpixel constituting a pixel, a first light-emitting element constituting the first subpixel, a second light-emitting element constituting the second subpixel, a first pixel circuit corresponding to the first subpixel, a second pixel circuit corresponding to the second subpixel, and a drive unit configured to supply a first data signal to the first pixel circuit and a second data signal to the second pixel circuit. Each of the first light-emitting element and the second light-emitting element has element characteristics having, in a relationship between luminance and current density, a first region in which a luminance forms a downward convex shape, a second region in which the luminance forms an upward convex shape and the luminance is higher than the luminance of the first region, and an inflection point present at a boundary between the first region and the second region. The first data signal is configured to cause a current of a first current density to flow through the first light-emitting element and to cause the first light-emitting element to emit light at a first luminance, and the second data signal is configured to cause a current of a second current density to flow through the second light-emitting element and to cause the second light-emitting element to emit light at a second luminance. At some of gray scales, a gray scale value of the first data signal is smaller than a gray scale value of the second data signal.

According to an aspect of the disclosure, a display and a driving method of a display capable of achieving power consumption saving, even when a light-emitting element is used in which a relationship between a current density and a luminance in a low current region is represented by a line having a downward convex shape.

DESCRIPTION OF EMBODIMENTS

Embodiments of the present disclosure will be described with reference to FIG. 1 to FIG. 18 as follows. Hereinafter, for convenience of explanation, components having the same functions as those described in a specific embodiment are appended with the same reference signs, and descriptions thereof may be omitted.

Figure 1:
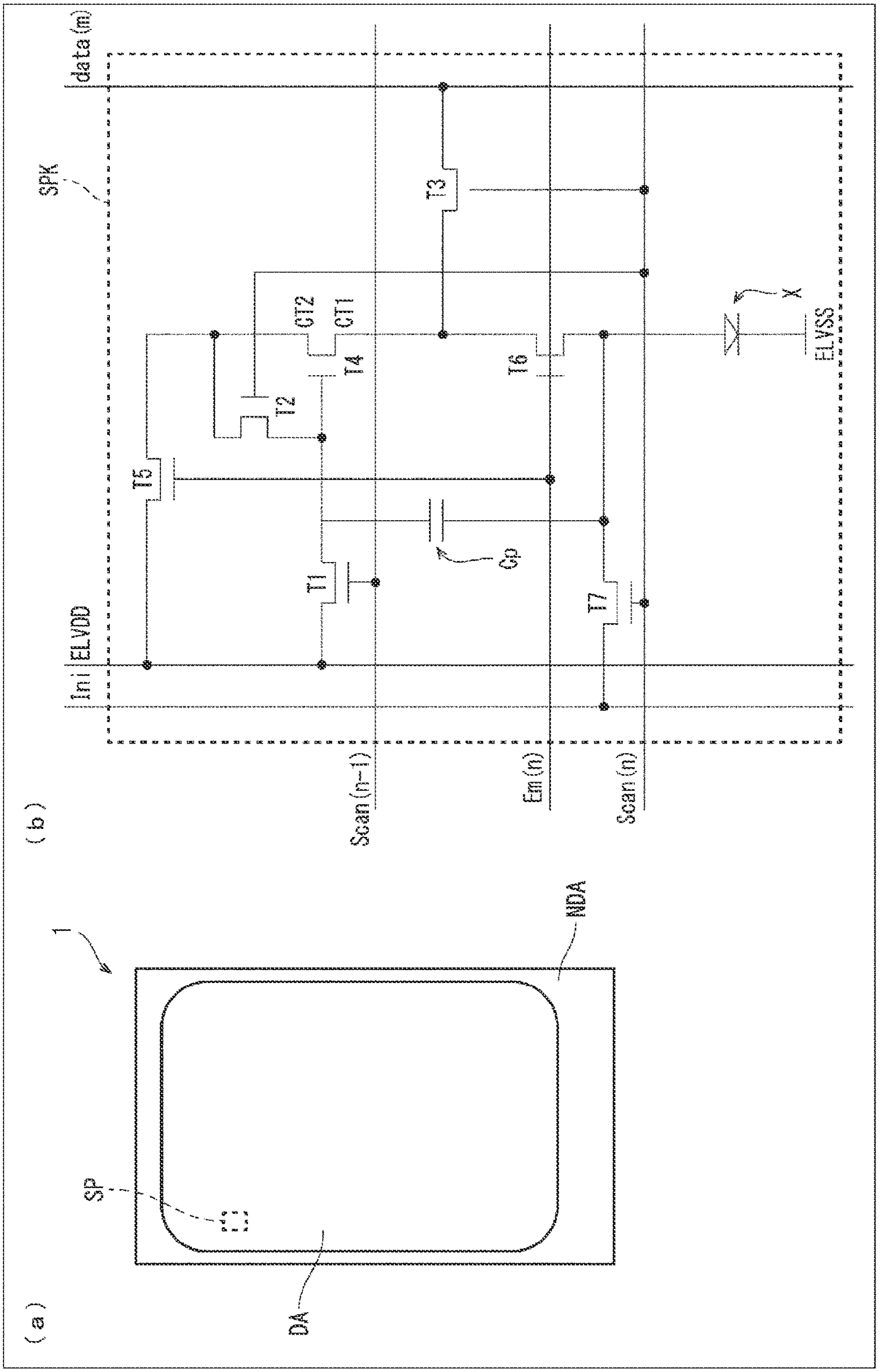
FIG. 1(*a*) is a schematic plan view illustrating a configuration of a display of a first embodiment, and FIG. 1(*b*) is a circuit diagram illustrating an example of a subpixel circuit of the display of the first embodiment.

First Embodiment (a) of FIG. 1 is a schematic plan view illustrating a configuration of a display 1 of a first embodiment, and (b) of FIG. 1 is a circuit diagram illustrating an example of a subpixel circuit (a first pixel circuit or a second pixel circuit) SPK of the display 1 of the first embodiment.

Figure 2:
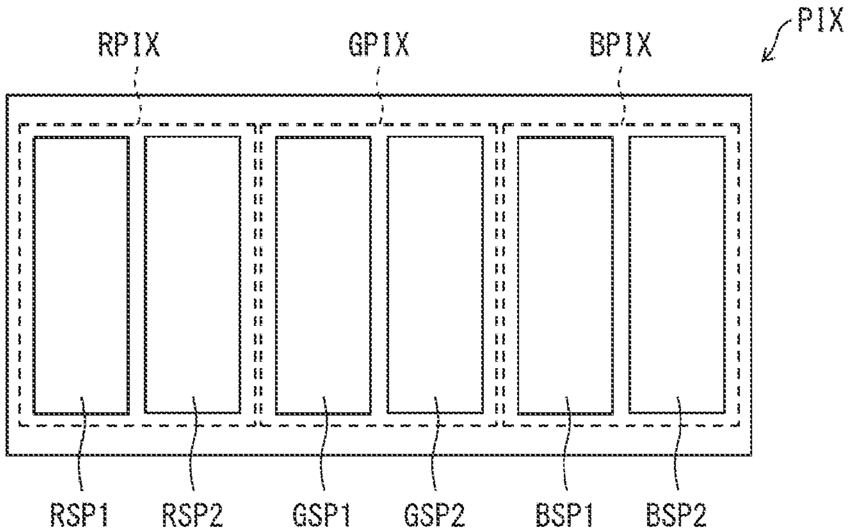
FIG. 2 is a diagram illustrating a configuration of one display unit of the display of the first embodiment illustrated in FIG. 1.

FIG. 2 is a diagram illustrating a configuration of one display unit PIX of the display 1 of the first embodiment illustrated in FIG. 1.

As illustrated in (a) of FIG. 1, the display device 1 of the first embodiment includes a display region DA including a plurality of subpixels SP, and a frame region NDA surrounding the display region DA, and, although not illustrated, the frame region NDA is provided with a terminal portion. Then, as illustrated in (b) of FIG. 1, for each of the subpixels SP illustrated in (a) of FIG. 1, a light-emitting element X and the subpixel circuit SPK that drives the light-emitting element X are provided.

As illustrated in (a) of FIG. 1 and (b) of FIG. 1, the subpixel SP of each color includes the light-emitting element X (first light-emitting element or second light-emitting element). Then, the area and element characteristics of the light-emitting element X become the size and display characteristics of the subpixel SP.

Note that the light-emitting element X provided in the display 1 is a quantum dot light-emitting diode (QLED).

(b) of FIG. 1 is the circuit diagram illustrating an example of the subpixel circuit SPK of the display 1 of the first embodiment. This subpixel circuit SPK is provided for each of a red first subpixel RSP1, a red second subpixel RSP2, a green first subpixel GSP1, a green second subpixel GSP2, a blue second subpixel BSP1, and a blue second subpixel BSP2 illustrated in FIG. 2.

The subpixel circuit SPK illustrated in (b) of FIG. 1 includes a capacitance element Cp. Furthermore, the subpixel circuit SPK includes a first initialization transistor T1 connected between a high power supply voltage line ELVDD (in the present embodiment, although the high power supply voltage line ELVDD also functions as a first initialization power source line, the present embodiment is not limited thereto, and they may be provided separately) and a control terminal of a drive transistor T4. A gate terminal of the first initialization transistor T1 is connected to a scanning signal line Scan(n−1) of the preceding stage ((n−1)th stage).

Further, the subpixel circuit SPK includes a threshold value control transistor T2 connected between a second conductor CT2 and the control terminal of the drive transistor T4, and a gate terminal of the threshold value control transistor T2 is connected to a scanning signal line Scan(n) of its own stage ((n)th stage). Furthermore, the subpixel circuit SPK includes a writing control transistor T3 connected between a data signal line data(m) and a source region S of the drive transistor T4, a gate terminal of the writing control transistor T3 being connected to the scanning signal line Scan(n) of its own stage ((n)th stage), the drive transistor (a drive transistor that controls the current density flowing through the light-emitting element X) T4 controlling the current of the light-emitting element X, and a power supply transistor T5 connected between the high power supply voltage line ELVDD and the second conductor CT2 of the drive transistor T4, a gate terminal of the power supply transistor T5 being connected to a light emission control line Em at the (n)th stage.

Further, the subpixel circuit SPK includes a light emission control transistor T6 connected between a first conductor CT1 of the drive transistor T4 and a first electrode of the light-emitting element X, a gate terminal of the light emission control transistor T6 being connected to the light emission control line Em at the (n)th stage, and a second initialization transistor T7 connected between a second initialization power source line Ini and the first electrode of the light-emitting element X, a gate terminal of the second initialization transistor T7 being connected to the scanning signal line Scan(n) of its own stage ((n)th stage).

Note that, in the present embodiment, the same voltage as that of a low power supply voltage line ELVSS is input to the second initialization power source line Ini, but the present embodiment is not limited thereto. A different voltage that causes the light-emitting element X to be turned off may be input to the second initialization power source line Ini.

In the present embodiment, as described in the subpixel circuit SPK illustrated in (b) of FIG. 1, an example is described in which the transistors T1 to T7 are, for example, n-channel transistors, but the present embodiment is not limited to this example. In a case in which another subpixel circuit different from the subpixel circuit SPK illustrated in (b) of FIG. 1 is used, all the transistors T1 to T7 may be p-channel transistors, or some of them may be p-channel transistors. The capacitance element Cp is connected to the control terminal of the drive transistor T4, and holds a data signal in the data signal line data(m). Note that the second initialization transistor T7 may be connected to the scanning signal line Scan(n−1) of the preceding stage ((n−1)th stage).

Note that the subpixel circuit SPK illustrated in (b) of FIG. 1 illustrates the (n, m)th subpixel circuits SPK, but also includes a part of the (n−1, m)th subpixel circuit SPK.

As illustrated in FIG. 2, the one display unit PIX of the display 1 of the first embodiment can be constituted by a plurality of pixels. Here, the one display unit PIX is a minimum unit in which all colors of color coordinates, which can be expressed by the display 1, can be displayed. In the present embodiment, as illustrated in FIG. 2, an example is described in which the one display unit PIX of the display 1 is constituted by a red pixel RPIX, a green pixel GPIX, and a blue pixel BPIX, but the present embodiment is not limited to this example. The one display unit PIX of the display 1 may be constituted by four or more of the pixels. For example, when the one display unit PIX is constituted by four pixels, a pixel of a color other than red, green, and blue can be included. For example, a white pixel may be included.

As illustrated in FIG. 2, in the case of the display 1, each of the red pixel RPIX, the green pixel GPIX, and the blue pixel BPIX constituting the one display unit PIX is further divided into two subpixels.

In other words, the red pixel RPIX is constituted by the red first subpixel RSP1 and the red second subpixel RSP2, and the red first subpixel RSP1 and the red second subpixel RSP2 are disposed adjacent to each other. The green pixel GPIX is constituted by the green first subpixel GSP1 and the green second subpixel GSP2, and the green first subpixel GSP1 and the green second subpixel GSP2 are disposed adjacent to each other. The blue pixel BPIX is constituted by the blue first subpixel BSP1 and the blue second subpixel BSP2, and the blue first subpixel BSP1 and the blue second subpixel BSP2 are disposed adjacent to each other.

Note that, as illustrated in FIG. 2, in the present embodiment, an example is described in which the size of each of the red pixel RPIX, the green pixel GPIX, and the blue pixel BPIX is identical, and the size of the subpixel of each color, namely, the size of each of the red first subpixel RSP1, the red second subpixel RSP2, the green second subpixel GSP1, the green second subpixel GSP2, the blue first subpixel BSP1, and the blue second subpixel BSP2 is also all identical, but the present embodiment is not limited to this example.

For example, the sizes of the red pixel RPIX, the green pixel GPIX, and the blue pixel BPIX may be different from each other, and of the red pixel RPIX, the green pixel GPIX, and the blue pixel BPIX, the size of any one of the pixels may be different from the size of the other two pixels having the same size.

The size of the first subpixel and the size of the second subpixel of each color are preferably substantially identical to each other. For example, the size of the first subpixel (specifically, a light-emitting region of the light-emitting element (first light-emitting element) constituting the first subpixel) is preferably from 0.95 times to 1.05 times the size of the second subpixel (specifically, a light-emitting region of the light-emitting element (second light-emitting element) constituting the second subpixel). In other words, the size of the red first subpixel RSP1 and the size of the red second subpixel RSP2, the size of the green first subpixel GSP1 and the size of the green second subpixel GSP2, and the size of the blue first subpixel BSP1 and the blue second subpixel BSP2 are preferably substantially identical to each other.

In the present embodiment, since the size of the subpixel of each color is identical, the light-emitting element (first light-emitting element) constituting the red first subpixel RSP1 and the light-emitting element (second light-emitting element) constituting the red second subpixel RSP2 are substantially identical in terms of the size and element characteristics. Similarly, the light-emitting element (first light-emitting element) constituting the green first subpixel GSP1 and the light-emitting element (second light-emitting element) constituting the green second subpixel GSP2 are substantially identical in terms of the size and element characteristics, and the light-emitting elements (first light-emitting elements) constituting the blue first subpixel BSP1 and the light-emitting elements (second light-emitting elements) constituting the blue second subpixel BSP2 are substantially identical in terms of the size and element characteristics.

Figure 3:
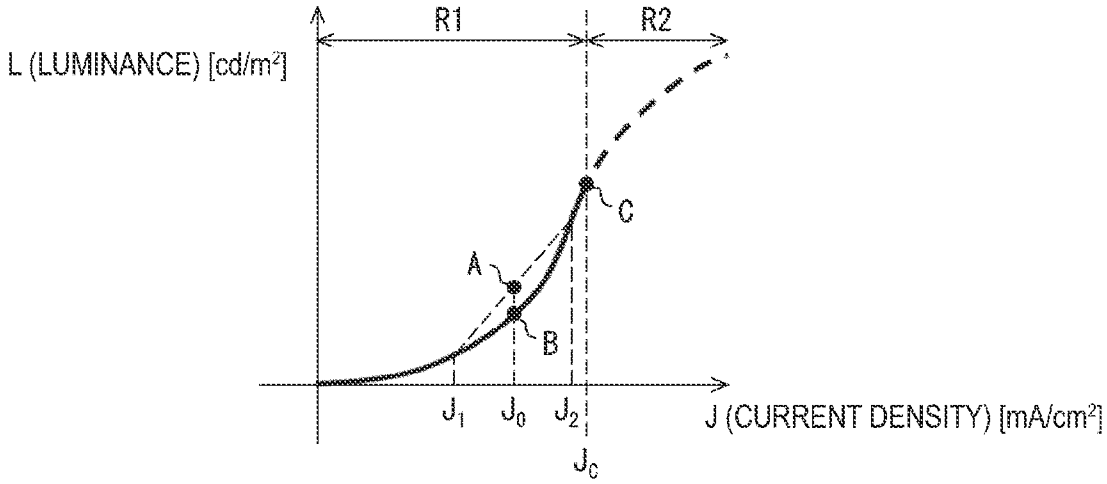
FIG. 3 is a diagram showing element characteristics of a light-emitting element, illustrated in FIG. 2, constituting each of two subpixels of the same color disposed adjacent to each other.

FIG. 3 is a diagram showing the element characteristics of the light-emitting elements constituting the red first subpixel RSP1 and the red second subpixel RSP2, respectively, which are disposed adjacent to each other as illustrated in FIG. 2.

In the present embodiment, since the size of the red first subpixel RSP1 and the size of the red second subpixel RSP2 are identical, two light-emitting elements having the element characteristics shown in FIG. 3 are used as each of the light-emitting element (first light-emitting element) constituting the red first subpixel RSP1 and the light-emitting element (second light-emitting element) constituting the red second subpixel RSP2. Thus, the light-emitting element (first light-emitting element) constituting the red first subpixel RSP1 and the light-emitting element (second light-emitting element) constituting the red second subpixel RSP2 are substantially identical in terms of the size and element characteristics.

As shown in FIG. 3, each of the light-emitting element (first light-emitting element) constituting the red first subpixel RSP1 and the light-emitting element (second light-emitting element) constituting the red second subpixel RSP2 is a QLED having element characteristics that include, in a relationship between a luminance L and a current density J, a first region R1 in which the luminance L forms a downward convex shape, a second region R2 in which the luminance L forms an upward convex shape and the luminance L is higher than that of the first region R1, and an inflection point C present at a boundary between the first region R1 and the second region R2. Note that the inflection point is included in the first region R1. Further, when the current density J is 0, the inflection point is not included in the first region R1.

Note that the quantum light-emitting diode (QLED) is a light-emitting element including a light-emitting layer containing quantum dot (nanoparticle) phosphors. As a specific material of the quantum dot (nanoparticle), for example, any one of ZnSe/ZnS, CdSe/CdS, CdSe/ZnS, InP/ZnS, and CIGS/ZnS may be used, and the particle diameter of the quantum dot (nanoparticle) is approximately from 3 to 10 nm.

A first input image signal, which is a signal relating to a gray scale value for causing the light-emitting element (first light-emitting element) constituting the red first subpixel RSP1 to emit light at a desired luminance, and a second input image signal, which is a signal relating to a gray scale value for causing the light-emitting element (second light-emitting element) constituting the red second subpixel RSP2 to emit light at a desired luminance, are input to the display 1. The gray scale value of the first input image signal and the gray scale value of the second input image signal may be the same, or the first input image signal may be used as a substitute for the second input image signal as the same value.

Note that the gray scale value corresponds to the luminance in a one-to-one manner, and normally, when the gray scale value increases, the luminance also increases, and when the gray scale value decreases, the luminance also decreases.

Figure 4:
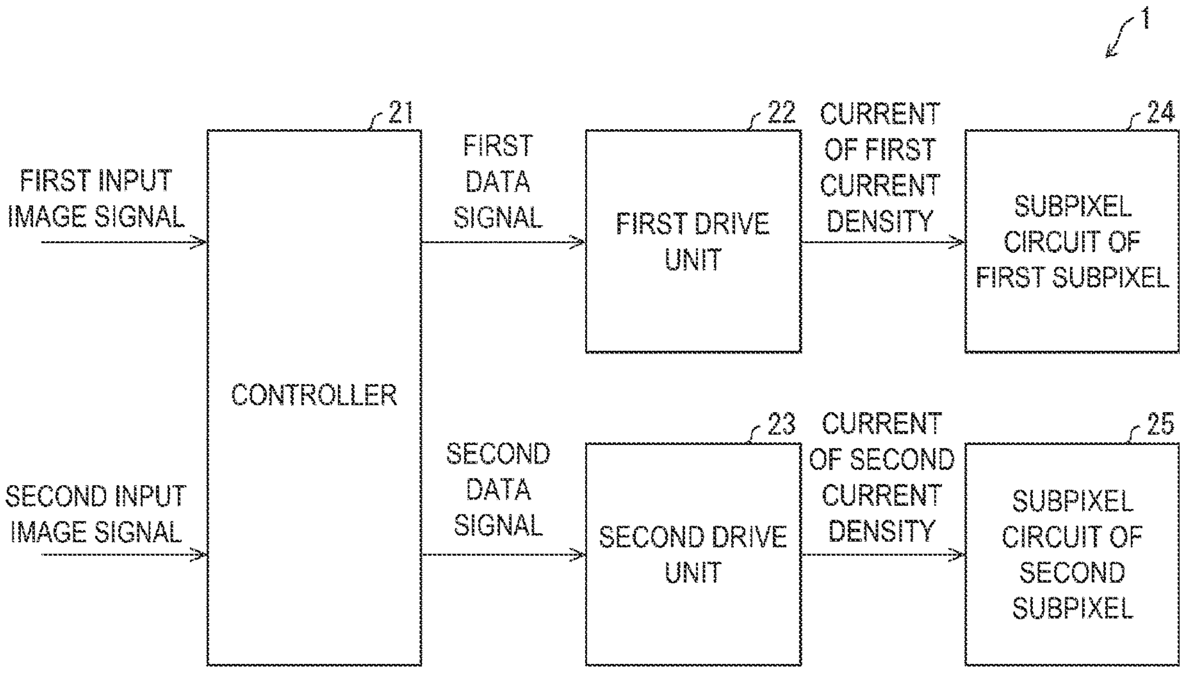
FIG. 4 is a diagram illustrating a flow of signals of the display of the first embodiment.

FIG. 4 is a diagram illustrating a flow of various signals in the display 1 of the present embodiment.

As shown in FIG. 3, when the first input image signal and the second input image signal are signals with which the desired luminance L corresponding to the current density J of the light-emitting element (first light-emitting element) constituting the red first subpixel RSP1 and the desired luminance L corresponding to the current density J of the light-emitting element (second light-emitting element) constituting the red second subpixel RSP2 are in the first region R1, namely, when L (desired luminance) of the light-emitting element (first light-emitting element) constituting the red first subpixel RSP1 and the light-emitting element (second light-emitting element) constituting the red second subpixel RSP2 satisfies Formula (C) described below, in a controller 21 of the display 1 illustrated in FIG. 4, the first input image signal and the second input image signal are changed into a first data signal and a second data signal. Specifically, the gray scale value of the first data signal and the gray scale value of the second data signal are changed so as to be different from each other, and the first subpixel is driven via a first drive unit (first drive circuit) 22, and the second subpixel is driven via a second drive unit (second drive circuit) 23. Specifically, a current of a first current density corresponding to the first data signal is supplied to a subpixel circuit (SPK) 24 of the red first subpixel RSP1 via the first drive unit (drive unit) 22 illustrated in FIG. 4, and a current of a second current density corresponding to the second data signal is supplied to a subpixel circuit (SPK) 25 of the red second subpixel RSP2 via the second drive unit (drive unit) 23. Here, the data signal is a voltage proportional to the luminance or the gray scale value, but the data signal is not limited thereto, and may be a digital signal corresponding to the gray scale value.

$$0 < L(\text{desired luminance}) < L_C \qquad \text{Formula (C)}$$

In Formula (C) described above, $L_C$ means the luminance L corresponding to a current density $J_C$.

In other words, in a driving method of the display 1, the first data signal is input to a first drive transistor (drive transistor T4 in (b) of FIG. 1) that controls the current density flowing through a light-emitting element (first light-emitting element) so as to cause a first current density $J_1$ to flow through the light-emitting element (first light-emitting element) constituting the red first subpixel RSP1 and cause the light-emitting element (first light-emitting element) constituting the red first subpixel RSP1 to emit light at a first luminance, and the second data signal is input to a second drive transistor (drive transistor T4 in (b) of FIG. 1) that controls the current density flowing through a light-emitting element (second light-emitting element) so as to cause a second current density $J_2$ to flow through the light-emitting element (second light-emitting element) constituting the red second subpixel RSP2 and cause the light-emitting element (second light-emitting element) constituting the red second subpixel RSP2 to emit light at a second luminance.

Then, as shown in FIG. 3, when each of the first luminance corresponding to the first current density $J_1$ of the light-emitting element (first light-emitting element) constituting the red first subpixel RSP1 and the second luminance corresponding to the second current density $J_2$ of the light-emitting element (second light-emitting element) constituting the red second subpixel RSP2 is a luminance that falls within the first region R1, the first data signal is smaller than the second data signal.

Note that the first data signal being smaller than the second data signal means that the gray scale value, namely, the luminance, indicated by the first data signal is smaller than the gray scale value, namely, the luminance, indicated by the second data signal.

In the present embodiment, each of the first luminance corresponding to the first current density $J_1$ of the light-emitting element (first light-emitting element) constituting the red first subpixel RSP1 and the second luminance corresponding to the second current density $J_2$ of the light-emitting element (second light-emitting element) constituting the red second subpixel RSP2 is the luminance that falls within the first region R1, and the first current density $J_1$ is smaller than the second current density $J_2$. Thus, the first data signal becomes smaller than the second data signal, but the present embodiment is not limited to this example.

For example, even when each of the first luminance corresponding to the first current density $J_1$ of the light-emitting element (first light-emitting element) constituting the red first subpixel RSP1 and the second luminance corresponding to the second current density $J_2$ of the light-emitting element (second light-emitting element) constituting the red second subpixel RSP2 is the luminance that falls within the first region R1, if the first current density $J_1$ is greater than the second current density $J_2$, the first data signal becomes greater than the second data signal.

As described above, in the display 1 according to the present embodiment, the red pixel RPIX is constituted by the red first subpixel RSP1 and the red second subpixel RSP2 having the same size, the first current density $J_1$ is caused to flow through the light-emitting element (first light-emitting element) constituting the red first subpixel RSP1, the second current density $J_2$ different from the first current density $J_1$ (in the present embodiment, the first current density $J_1$<the second current density $J_2$) is caused to flow through the light-emitting element (second light-emitting element) constituting the red second subpixel RSP2, the red first subpixel RSP1 has the first luminance corresponding to the first current density $J_1$, and the red second subpixel RSP2 has the second luminance corresponding to the second current density $J_2$.

A description will be given below relating to a reason why the power consumption saving can be achieved by using the driving method of the display 1 of the present embodiment, even when the light-emitting element is used in which the relationship between the current density J and the luminance L in a low current region (first region R1) is represented by the line having the downward convex shape.

As shown in FIG. 3, an average value of the first luminance corresponding to the first current density $J_1$ of the red first subpixel RSP1 and the second luminance corresponding to the second current density $J_2$ of the red second subpixel RSP2 is a luminance indicated by a point A in FIG. 3. In other words, an effective luminance of the red pixel RPIX obtained by combining the red first subpixel RSP1 and the red second subpixel RSP2 can be calculated by Formula (D) described below.

$$(L(J_1)+L(J_2))/2 \qquad \text{Formula (D)}$$

Note that, in Formula (D) described above, $L(J_1)$ is a function indicating the luminance when the current density is $J_1$, and $L(J_2)$ is a function indicating the luminance when the current density is $J_2$.

Further, as shown in FIG. 3, an average value of the first current density $J_1$ of the red first subpixel RSP1 and the second current density $J_2$ of the red second subpixel RSP2 is a current density $J_0$ based on Formula (E) described below.

$$(J_1+J_2)/2=J_0 \qquad \text{Formula (E)}$$

When the above-described driving method of the display 1 of the present embodiment is used, the luminance of the red pixel RPIX is the luminance indicated by the point A in FIG. 3. However, for example, as in a known example, when the current density $J_0$, which is the average value of the first current density $J_1$ and the second current density $J_2$, is caused to flow through both the light-emitting element (first light-emitting element) constituting the red first subpixel RSP1 and the light-emitting element (second light-emitting element) constituting the red second subpixel RSP2, the luminance of the red pixel RPIX is a luminance indicated by a point B in FIG. 3.

This means that even when the same current density (current amount) is applied in the present embodiment and the known example, in the case of the present embodiment, a brighter display can be achieved compared to the case of the known example. Thus, according to the display 1 of the present embodiment or the driving method of the display 1 of the present embodiment, power consumption saving can be achieved in the first region R1 shown in FIG. 3, compared to the known example.

Further, in order to display the red pixel RPIX at the luminance indicated by the point A in FIG. 3, the first input image signal and the second input image signal input to the display 1 need to be signals each having a gray scale value corresponding to the luminance indicated by the point A in FIG. 3. From FIG. 3, it is evident that a current density $J_X$ (not shown) corresponding to this gray scale value is larger than the current density $J_0$ ($J_X$>$J_0$). Thus, when the first input image signal and the second input image signal input to the display 1 are used as they are, the current density (current amount) equivalent to the current density $J_X$×2 is required to obtain the luminance indicated by the point A in FIG. 3 as the luminance of the red pixel RPIX. However, as in the present embodiment, when the first input image signal and the second input image signal are used after being changed into the first data signal and the second data signal, the current density (current amount) equivalent to the current density $J_0$×2 is required to obtain the luminance indicated by the point A in FIG. 3, as the luminance of the red pixel RPIX. Thus, according to the display 1 of the present embodiment or the driving method of the display 1 of the present embodiment, the power consumption saving can be achieved in the first region R1 shown in FIG. 3, compared to the case in which the first input image signal and the second input image signal input to the display 1 are used as they are.

Note that in the controller 21 of the display 1 illustrated in FIG. 4, it is determined, based on the gray scale value corresponding to the desired luminance L, whether the first input image signal and the second input image signal relating to the desired luminance L of the red first subpixel RSP1 and the desired luminance L of the red second subpixel RSP2 are signals in the first region R1, and when they are the signals in the first region R1, the first input image signal and the second input image signal are changed into the first data signal and the second data signal. Note that the process of changing the first input image signal and the second input image signal into the first data signal and the second data signal can be performed, for example, using a lookup table.

When actual measurements were taken by the inventors of the disclosure using a light-emitting element obtained by layering Al having a film thickness of 100 nm as a cathode electrode, ZnMgO having a film thickness of 30 nm as an electron transport layer (ETL), ZnSe/ZnS having a film thickness of 30 nm as a light-emitting layer containing quantum dots (nanoparticles) phosphors, PVK having a film thickness of 10 nm as a hole transport layer (HTL), PEDOT:PSS having a film thickness of 40 nm as a hole injection layer (HIL), and ITO (indium tin oxide) having a film thickness of 30 nm as an anode electrode, the inventors could confirm that, in the relationship between the luminance L and the current density J, the first region R1 in which the luminance L forms the line having the downward convex shape was obtained when the current density was 160 $mA/cm^2$ or less.

Figure 5:
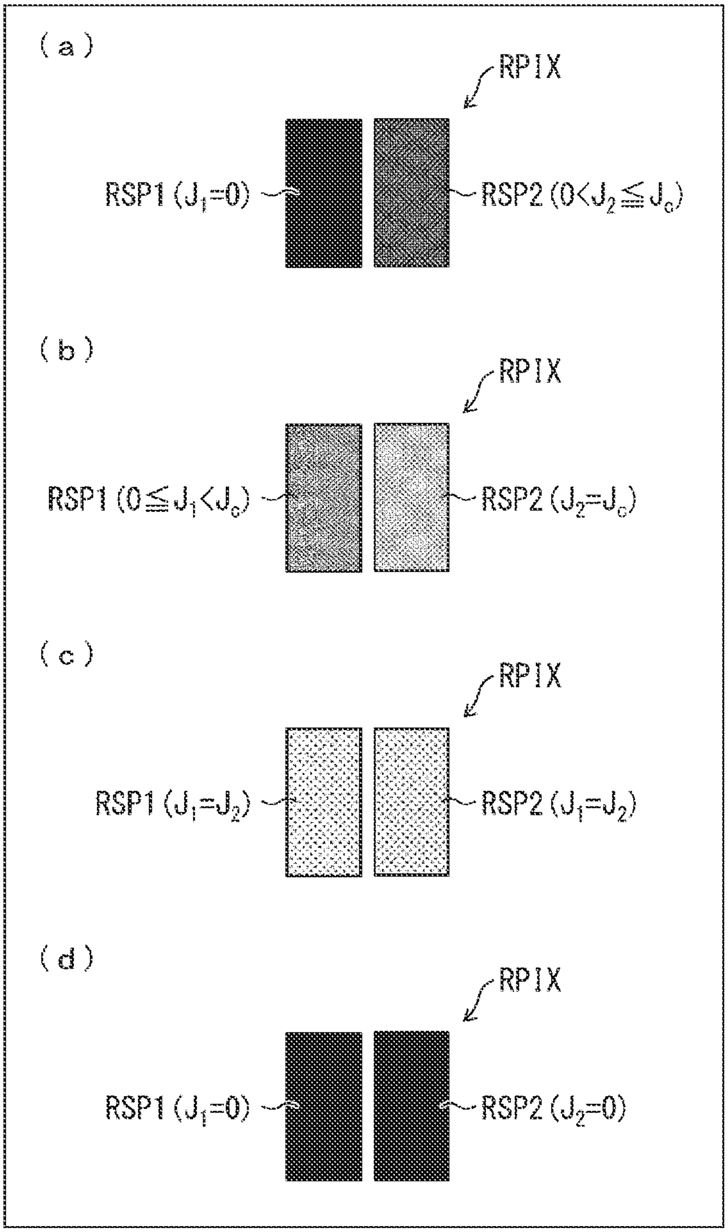
FIG. 5(*a*) is a diagram illustrating a case in which a red pixel of the display of the first embodiment illustrated in FIG. 1 is displayed at a low luminance, FIG. 5(*b*) is a diagram illustrating a case in which the red pixel of the display of the first embodiment illustrated in FIG. 1 is displayed at a medium luminance, FIG. 5(*c*) is a diagram illustrating a case in which the red pixel of the display of the first embodiment illustrated in FIG. 1 is displayed at a high luminance, and FIG. 5(*d*) is a diagram illustrating a case in which the red pixel of the display of the first embodiment illustrated in FIG. 1 is displayed at a luminance of the lowest gray scale.

(a) of FIG. 5 is a diagram illustrating a case in which the red pixel RPIX of the display 1 is displayed at a low luminance, (b) of FIG. 5 is a diagram illustrating a case in which the red pixel RPIX of the display 1 is displayed at a medium luminance, (c) of FIG. 5 is a diagram illustrating a case in which the red pixel RPIX of the display 1 is displayed at a high luminance, and (d) of FIG. 5 is a diagram illustrating a case in which the red pixel RPIX of the display 1 is displayed at a luminance of the lowest gray scale.

The case illustrated in (a) of FIG. 5 in which the red pixel RPIX of the display 1 is displayed at the low luminance, and the case illustrated in (b) of FIG. 5 in which the red pixel RPIX of the display 1 is displayed at the medium luminance are both cases in which the first input image signal and the second input image signal relating to the desired luminance L of the red first subpixel RSP1 and the desired luminance L of the red second subpixel RSP2 are the signals in the first region R1, and in which driving is performed after changing the first input image signal and the second input image signal into the first data signal indicating the gray scale value corresponding to the first current density $J_1$ and the second data signal indicating the gray scale value corresponding to the second current density $J_2$.

As illustrated in (a) of FIG. 5, when the red pixel RPIX is displayed at the low luminance, the first current density $J_1$ of the current flowing into the light-emitting element (first light-emitting element) constituting the red first subpixel RSP1 can be set to 0, and the second current density $J_2$ of current flowing into the light-emitting element (second light-emitting element) constituting the red second subpixel RSP2 can be set to be within a range of $0<J_2 \le J_C$. Note that, here, as shown in FIG. 3, the current density $J_C$ refers to a current density at the inflection point C, and thus, $L_C$ is a luminance at the inflection point C.

As illustrated in (b) of FIG. 5, when the red pixel RPIX is displayed at the medium luminance, the first current density $J_1$ flowing into the light-emitting element (first light-emitting element) constituting the red first subpixel RSP1 is set to be within a range of $0 \le J_1 < J_C$, and the second current density $J_2$ flowing into the light-emitting element (second light-emitting element) constituting the red second subpixel RSP2 is set to be $J_2=J_C$.

In the present embodiment, an example is described in which the first current density $J_1$ flowing into the light-emitting element (first light-emitting element) constituting the red first subpixel RSP1 is set to be within the range of $0 \le J_1 < J_C$ and the second current density $J_2$ flowing into the light-emitting element (second light-emitting element) constituting the red second subpixel RSP2 is set to be $J_2=J_C$, but the present embodiment is not limited to this example. The first current density $J_1$ flowing into the light-emitting element (first light-emitting element) constituting the red first subpixel RSP1 may be set to be $J_1=J_C$, and the second current density $J_2$ flowing into the light-emitting element (second light-emitting element) constituting the red second subpixel RSP2 may be set to be within a range of $0 \le J_2 < J_C$.

As described above, when the red pixel RPIX is displayed at the low luminance or the medium luminance, there is a difference between the first current density $J_1$ flowing into the light-emitting element (first light-emitting element) constituting the red first subpixel RSP1 and the second current density $J_2$ flowing into the light-emitting element (second light-emitting element) constituting the red second subpixel RSP2. In other words, the first data signal and the second data signal are different signals.

On the other hand, the case illustrated in (c) of FIG. 5 in which the red pixel RPIX of the display 1 is displayed at the high luminance, and the case illustrated in (d) of FIG. 5 in which the red pixel RPIX of the display 1 is displayed at the luminance of the lowest gray scale are both cases in which the first input image signal and the second input image signal relating to the desired luminance L of the red first subpixel RSP1 and the desired luminance L of the red second subpixel RSP2 are signals in a region other than the first region R1, and in which the driving is performed using the first input image signal and the second input image signal as they are.

As illustrated in (c) of FIG. 5, when the red pixel RPIX is displayed at the high luminance, the driving is performed using the first input image signal and the second input image signal as they are. Thus, the first current density $J_1$ flowing into the light-emitting element (first light-emitting element) constituting the red first subpixel RSP1 and the second current density $J_2$ flowing into the light-emitting element (second light-emitting element) constituting the red second subpixel RSP2 are the same ($J_1=J_2$).

Further, as illustrated in (d) of FIG. 5, when the red pixel RPIX is displayed at the luminance of the lowest gray scale, namely, when the red pixel RPIX is displayed at the luminance of 0, the driving is also performed using the first input image signal and the second input image signal as they are. Thus, the first current density $J_1$ flowing into the light-emitting element (first light-emitting element) constituting the red first subpixel RSP1 and the second current density $J_2$ flowing into the light-emitting element (second light-emitting element) constituting the red second subpixel RSP2 are the same ($J_1=J_2$). Then, in this case, $J_1=J_2=0$.

Figure 6:
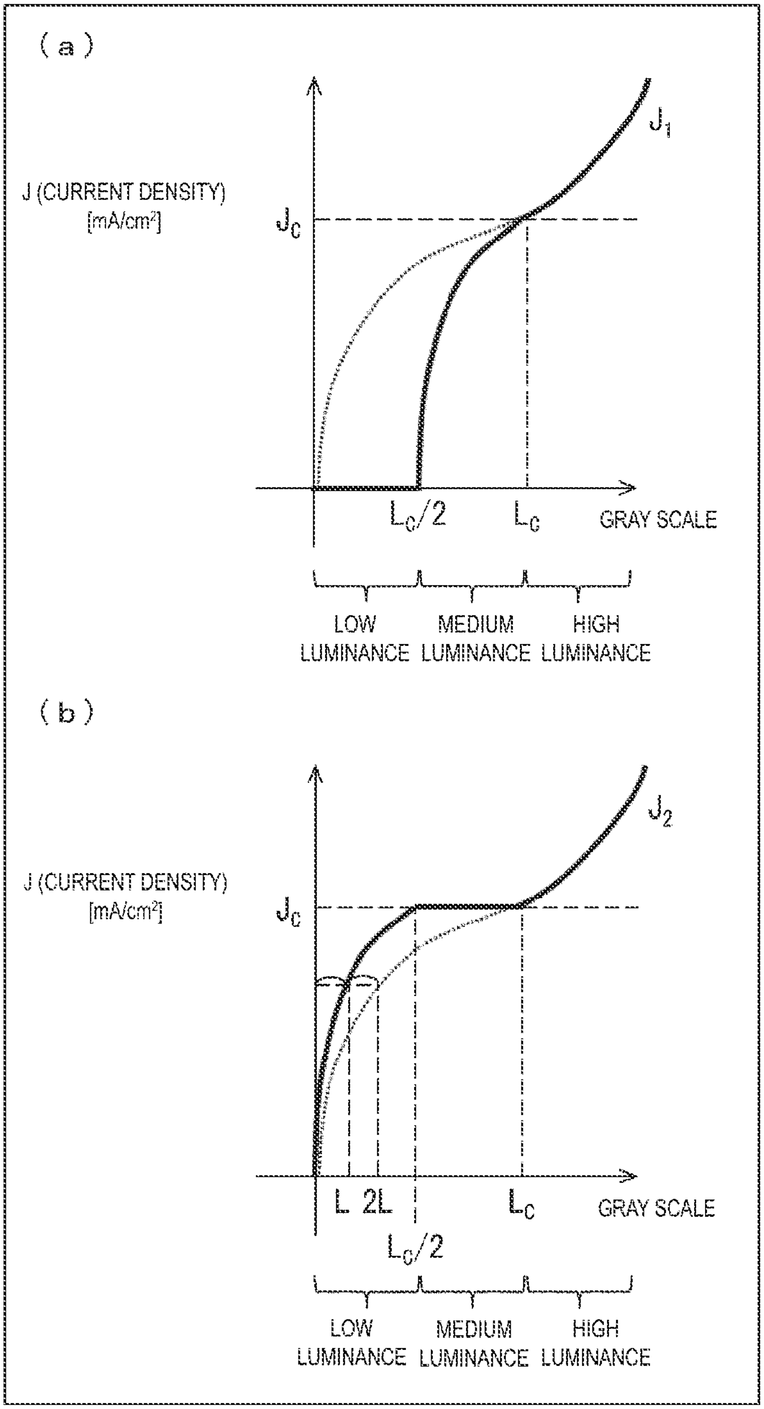
FIG. 6(*a*) and FIG. 6(*b*) are diagrams showing an example of a driving method of a red first subpixel and a red second subpixel included in the red pixel in the display of the first embodiment illustrated in FIG. 1.

(a) of FIG. 6 and (b) of FIG. 6 are diagrams showing an example of a driving method of the red first subpixel RSP1 and the red second subpixel RSP2 included in the red pixel RPIX in the display 1.

(a) of FIG. 6 is a diagram showing the first current density $J_1$ flowing into the light-emitting element (first light-emitting element) constituting the red first subpixel RSP1, and (b) of FIG. 6 is a diagram showing the second current density $J_2$ flowing into the light-emitting element (second light-emitting element) constituting the red second subpixel RSP2.

As shown in (a) of FIG. 6 and (b) of FIG. 6, when the desired luminance L of the red pixel RPIX is a low luminance ($0<L\leq L_C/2$), the first current density $J_1$ is set to 0, and the second current density $J_2$ is set to J (2L). Here, a reason why the second current density $J_2$ is set to J(2L) is that, since the size of the red first subpixel RSP1 and the size of the red second subpixel RSP2 are the same, and the first current density $J_1$ is set to 0, the second current density $J_2$ needs to be set to J(2L) in order to obtain the desired luminance L in the red pixel RPIX.

When the first input image signal and the second input image signal are signals that average, in an area-weighted manner, the luminance of the light-emitting element (first light-emitting element) constituting the red first subpixel RSP1 and the luminance of the light-emitting element (second light-emitting element) constituting the red second subpixel RSP2 and display the red pixel RPIX at the desired luminance L greater than the lowest gray scale, and the luminance of the light-emitting element (first light-emitting element) constituting the red first subpixel RSP1 and the luminance of the light-emitting element (second light-emitting element) constituting the red second subpixel RSP2 are luminances that fall within the first region R1, it is preferable that the first data signal be input to the first drive transistor (drive transistor T4 in (b) of FIG. 1) so that the first current density $J_1$ is caused to flow through the light-emitting element (first light-emitting element) constituting the red first subpixel RSP1 and the light-emitting element (first light-emitting element) constituting the red first subpixel RSP1 emits light at the first luminance L ($J_1$), the second data signal be input to the second drive transistor (drive transistor T4 in (b) of FIG. 1) so that the second current density $J_2$ is caused to flow through the light-emitting element (second light-emitting element) constituting the red second subpixel RSP2 and the light-emitting element (second light-emitting element) constituting the red second subpixel RSP2 emits light at the second luminance L ($J_2$), and the driving be performed so that the area-weighted average of the first luminance L ($J_1$) and the second luminance L ($J_2$) becomes equal to the desired luminance L.

Note that the area-weighted average is a value obtained by dividing the sum of the product of the luminance of the light-emitting element (first light-emitting element) constituting the red-first subpixel RSP1 and the area of the red-first subpixel RSP1 and the product of the luminance of the light-emitting element (second light-emitting element) constituting the red-second subpixel RSP2 and the area of the red-second subpixel RSP2, by the sum of the area of the red-first subpixel RSP1 and the area of the red-second subpixel RSP2, and can be expressed by Formula (F) described below.

Area-weighted average=(luminance of first light-emitting element×area of first subpixel+luminance of second light-emitting element×area of second subpixel)/(area of first subpixel+area of second subpixel)　　Formula (F)

Further, when the first input image signal and the second input image signal are the signals that average, in the area-weighted manner, the luminance of the light-emitting element (first light-emitting element) constituting the red first subpixel RSP1 and the luminance of the light-emitting element (second light-emitting element) constituting the red second subpixel RSP2 and display the red pixel RPIX at the desired luminance L greater than the lowest gray scale, the luminance of the light-emitting element (first light-emitting element) constituting the red first subpixel RSP1 and the luminance of the light-emitting element (second light-emitting element) constituting the red second subpixel RSP2 are luminances that fall within the first region R1, the luminance of the light-emitting element (first light-emitting element) constituting the red first subpixel RSP1 is greater than 0 and smaller than $L_C/2$, which is half the luminance $L_C$ of the inflection point C, and the luminance of the light-emitting element (second light-emitting element) constituting the red second subpixel RSP2 is greater than 0 and smaller than $L_C/2$, which is half the luminance $L_C$ of the inflection point C, it is preferable that the first current density $J_1$ be set to 0, and the second current density $J_2$ be set to J(2L).

Note that the case in which the luminance of the light-emitting element (first light-emitting element) constituting the red first subpixel RSP1 is greater than 0 and smaller than $L_C/2$, which is half the luminance $L_C$ of the inflection point C, and the luminance of the light-emitting element (second light-emitting element) constituting the red second subpixel RSP2 is greater than 0 and smaller than $L_C/2$, which is half the luminance $L_C$ of the inflection point C is a case in which the desired luminance L of the red pixel RPIX is a low luminance ($0<L\leq L_C/2$).

Further, as shown in (a) of FIG. 6 and (b) of FIG. 6, when the desired luminance L of the red pixel RPIX is a medium luminance ($L_C/2<L\leq L_C$), the first current density $J_1$ is set to $J(2L-L_C)$, and the second current density $J_2$ is set to $J_C$. Here, a reason why the first current density $J_1$ is set to $J(2L-L_C)$ is that, since the size of the red first subpixel RSP1 and the size of the red second subpixel RSP2 are the same, and the second current density $J_2$ is set to $J_C$, the first current density $J_1$ needs to be set to $J(2L-L_C)$, namely, a current density corresponding to a luminance obtained by subtracting the luminance $L_C$ at the inflection point C from a luminance obtained by doubling the desired luminance L of the red pixel RPIX in order to obtain the desired luminance L in the red pixel RPIX to compensate for insufficient luminance.

In other words, when the first input image signal and the second input image signal are the signals that average, in the area-weighted manner, the luminance of the light-emitting element (first light-emitting element) constituting the red first subpixel RSP1 and the luminance of the light-emitting element (second light-emitting element) constituting the red second subpixel RSP2 and display the red pixel RPIX at the desired luminance L greater than the lowest gray scale, the luminance of the light-emitting element (first light-emitting element) constituting the red first subpixel RSP1 and the luminance of the light-emitting element (second light-emitting element) constituting the red second subpixel RSP2 are luminances that fall within the first region R1, the luminance of the light-emitting element (first light-emitting element) constituting the red first subpixel RSP1 is smaller than the luminance $L_C$ of the inflection point C and greater than $L_C/2$, which is half the luminance $L_C$ at the inflection point C, and the luminance of the light-emitting element (second light-emitting element) constituting the red second subpixel RSP2 is smaller than the luminance $L_C$ of the inflection point C and greater than $L_C/2$, which is half the luminance $L_C$ at the inflection point C, it is preferable that the second current density $J_2$ be set to $J_C$, and the first current density $J_1$ be set to a current density $J(2L-L_C)$ corresponding to a luminance $(2L-L_C)$ obtained by subtracting the luminance $L_C$ of the inflection point C from a luminance 2L, which is a luminance twice as large as the desired luminance L.

Note that the case in which the luminance of the light-emitting element (first light-emitting element) constituting the red first subpixel RSP1 is greater than $L_C/2$, which is half the luminance $L_C$ of the inflection point C, and smaller than the luminance $L_C$ of the inflection point C, and the luminance of the light-emitting element (second light-emitting element) constituting the red second subpixel RSP2 is greater than $L_C/2$, which is half the luminance $L_C$ of the inflection point C, and smaller than the luminance $L_C$ of the inflection point C is a case in which the luminance L of the red pixel RPIX is a medium luminance ($L_C/2 \leq L < L_C$).

Further, as shown in (a) of FIG. 6 and (b) of FIG. 6, when the desired luminance L of the red pixel RPIX is a high luminance ($L_C \leq L$), the driving is performed using the first input image signal and the second input image signal as they are. Thus, the first current density $J_1$ and the second current density $J_2$ are caused to be the same ($J_1=J_2=J(L)$).

Furthermore, as shown in (a) of FIG. 6 and (b) of FIG. 6, when the desired luminance L of the red pixel RPIX is the luminance of the lowest gray scale (L=0), since the driving is performed using the first input image signal and the second input image signal as they are, the first current density $J_1$ and the second current density $J_2$ are caused to be the same ($J_1=J_2=0$).

In other words, in a first case in which the first input image signal and the second input image signal are the signals that display the red pixel RPIX at the luminance of the lowest gray scale, and in a second case in which the first input image signal and the second input image signal are the signals that average, in the area-weighted manner, the luminance of the light-emitting element (first light-emitting element) constituting the red first subpixel RSP1 and the luminance of the light-emitting element (second light-emitting element) constituting the red second subpixel RSP2 and display the red pixel RPIX at the desired luminance L greater than the lowest gray scale, and also the signals with which the luminance of the light-emitting element (first light-emitting element) constituting the red first subpixel RSP1 and the luminance of the light-emitting element (second light-emitting element) constituting the red second subpixel RSP2 are luminances that fall within the second region R2, it is preferable that the current density flowing through the light-emitting element (first light-emitting element) constituting the red first subpixel RSP1 and the current density flowing through the light-emitting element (second light-emitting element) constituting the red second subpixel RSP2 both be set to be a current density of the same value (third current density), and the driving be performed so that the luminance, of the light-emitting element (first light-emitting element) constituting the red first subpixel RSP1, corresponding to the current density of the same value (third current density), and the luminance, of the light-emitting element (second light-emitting element) constituting the red second subpixel RSP2, corresponding to the current density of the same value (third current density) are both equal to the desired luminance L.

As described above, in the display 1, since the driving method is applied in which the current is caused to flow only through the light-emitting element (second light-emitting element) constituting the red second subpixel RSP2 until the second current density $J_2$ flowing through the light-emitting element (second light-emitting element) constituting the red second subpixel RSP2 reaches the current density $J_C$, only after the light-emitting element (second light-emitting element) constituting the red second subpixel RSP2 has reached the current density $J_C$, the current is caused to start flowing through the light-emitting element (first light-emitting element) constituting the red first subpixel RSP1, and the current is caused to continue to flow until the first current density $J_1$ reaches the current density $J_C$, the difference between the first current density $J_1$ and the second current density $J_2$ can be made large.

Note that in the present embodiment, the driving method described above is used when the size of the red first subpixel RSP1 and the size of the red second subpixel RSP2 are the same, but the present embodiment is not limited to this example. The driving method can also be used when the size of the red first subpixel RSP1 and the size of the red second subpixel RSP2 are substantially identical, namely, when the size of the red first subpixel RSP1 is from 0.95 times to 1.05 times the size of the red second subpixel RSP2. Furthermore, the driving method can also be used when the size of the red first subpixel RSP1 is less than 0.95 times the size of the red second subpixel RSP2 or greater than 1.05 times the size of the red second subpixel RSP2.

Note that dotted lines shown in (a) of FIG. 6 indicate the element characteristics of the light-emitting element (first light-emitting element) constituting the red first subpixel RSP1, and dotted lines shown in (b) of FIG. 6 indicate the element characteristics of the light-emitting element (second light-emitting element) constituting the red second subpixel RSP2. In the present embodiment, since the light-emitting element (second light-emitting element) constituting the red second subpixel RSP2 having the same element characteristics as the element characteristics of the light-emitting element (first light-emitting element) constituting the red first subpixel RSP1 is used, the dotted lines shown in (a) of FIG. 6 match the dotted lines shown in (b) of FIG. 6. However, no such limitation is intended, and the element characteristics of the light-emitting element (first light-emitting element) constituting the red first subpixel RSP1 may be substantially identical to the element characteristics of the light-emitting element (second light-emitting element) constituting the red second subpixel RSP2.

Figure 7:
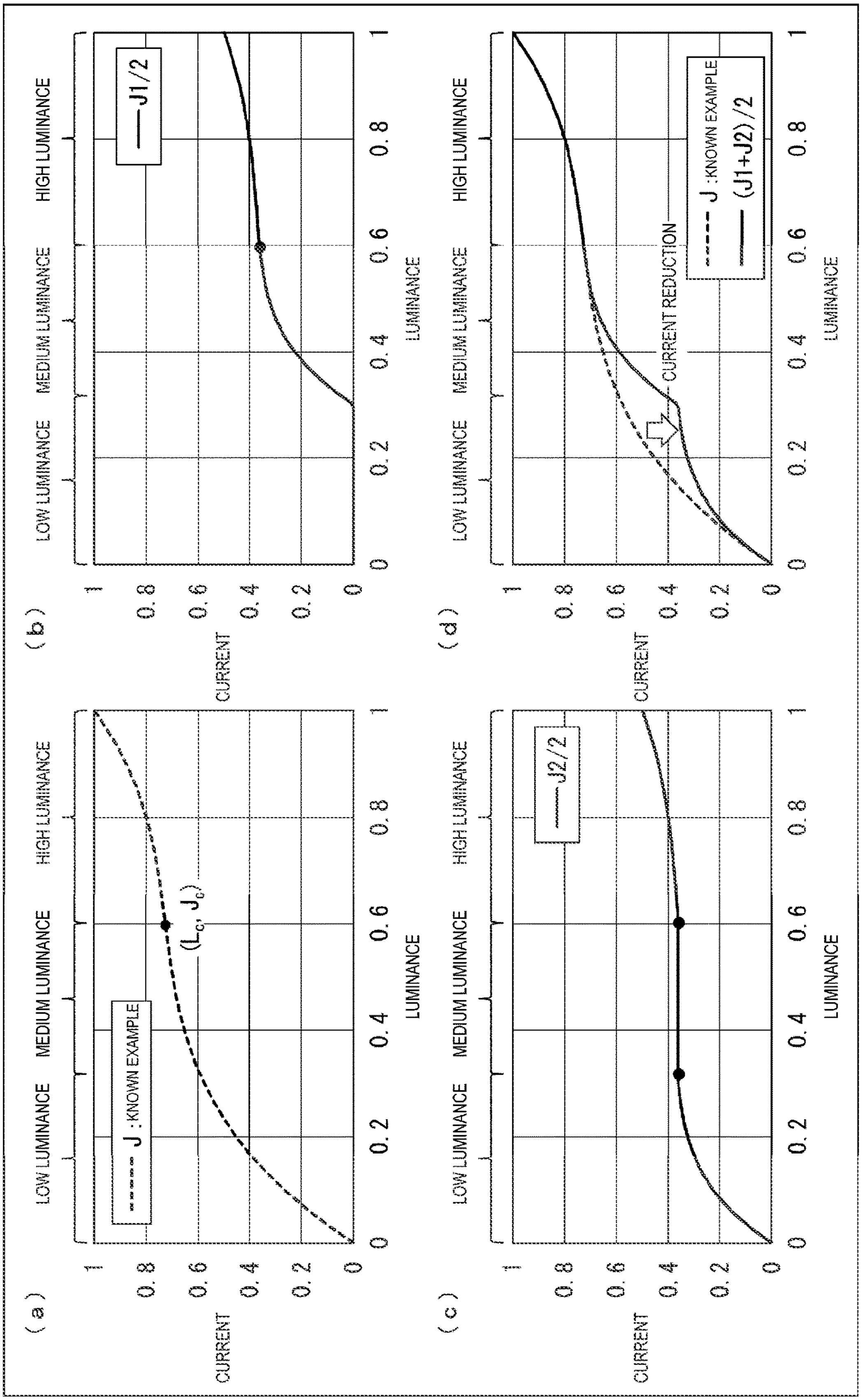
FIG. 7(*a*), FIG. 7(*b*), FIG. 7(*c*), and FIG. 7(*d*) are diagrams for describing a reason why power consumption can be reduced and power consumption saving can be achieved in the display of the first embodiment illustrated in FIG. 1 compared to a known display.

(a) of FIG. 7, (b) of FIG. 7, (c) of FIG. 7, and (d) of FIG. 7 are diagrams for describing a reason why the power consumption can be reduced and the power consumption saving can be achieved in the display 1 of the first embodiment illustrated in FIG. 1 compared to a known display.

In (a) of FIG. 7, (b) of FIG. 7, (c) of FIG. 7, and (d) of FIG. 7, values indicating the luminance and values indicating the current are normalized, and the maximum value thereof is set to 1 and the minimum value thereof is set to 0.

Further, in (a) of FIG. 7, (b) of FIG. 7, (c) of FIG. 7, and (d) of FIG. 7, the value indicating the current is a value obtained as the product of the current density and the area of the pixel or the area of the subpixel.

Note that, in a known example shown in (a) of FIG. 7, the area of one pixel constituting the red pixel RPIX is twice the area of the red first subpixel RSP1 or the area of the red second subpixel RSP2 shown in (b) of FIG. 7 and (c) of FIG. 7.

As shown in (a) of FIG. 7, it can be understood that in the case of the known example in which the red pixel RPIX is constituted by one light-emitting element, when the red pixel RPIX is displayed at a low luminance or a medium luminance, a required current (current amount) is relatively large. A reason why the required current (current amount) is relatively large in this way is that, in the case of the known example, the area of the one pixel constituting the red pixel RPIX is large, and in the relationship between the luminance L and the current density J shown in FIG. 3, no measure is taken for the first region R1 (a low luminance and medium luminance display region) in which the luminance L forms the line having the downward convex shape, and as a result of this, in the first region R1 (low luminance and medium luminance display region), there is no choice but to increase the current (current amount) caused to flow, to obtain the desired luminance.

On the other hand, as shown in (b) of FIG. 7 and (c) of FIG. 7, in the display 1, since the driving method is applied in which the current is caused to flow through the light-emitting element (second light-emitting element) constituting the red second subpixel RSP2 only until the second current density $J_2$ flowing through the light-emitting element (second light-emitting element) constituting the red second subpixel RSP2 reaches the current density $J_C$, only after the light-emitting element (second light-emitting element) constituting the red second subpixel RSP2 has reached the current density $J_C$, the current is caused to start flowing through the light-emitting element (first light-emitting element) constituting the red first subpixel RSP1, and the current is caused to continue to flow until the first current density $J_1$ reaches the current density $J_C$, the difference between the first current density $J_1$ and the second current density $J_2$ can be made large.

Each of the area of the red first subpixel RSP1 and the area of the red second subpixel RSP2 of the display 1 is half the area of the one pixel constituting the red pixel RPIX of the known example. Then, in the case of the display 1, in the relationship between the luminance L and the current density J shown in FIG. 3, with respect to the first region R1 (low luminance and medium luminance display region) in which the luminance L forms the line having the downward convex shape, as described above, the driving method is applied that causes the difference between the first current density $J_1$ and the second current density $J_2$ to be large. Thus, as shown in (d) of FIG. 7, compared to the known example, when the red pixel RPIX is displayed at a low luminance or a medium luminance, the required current (current amount) can be reduced.

Thus, according to the display 1 and the driving method of the display 1 described above, the power consumption saving can be achieved.

In the present embodiment, an example is described in which the first current density $J_1$ flowing into the light-emitting element (first light-emitting element) constituting the red first subpixel RSP1 is set to 0 and the second current density $J_2$ flowing into the light-emitting element (second light-emitting element) constituting the red second subpixel RSP2 is set to be within the range of $0<J_2\leq J_C$, but the present embodiment is not limited to this example. The first current density $J_1$ flowing into the light-emitting element (first light-emitting element) constituting the red first subpixel RSP1 may be set to be within a range of $0<J_1\leq J_C$, and the second current density $J_2$ flowing into the light-emitting element (second light-emitting element) constituting the red second subpixel RSP2 may be set to 0.

Note that in the present embodiment, an example is described in which the above-described driving method that causes the difference between the first current density $J_1$ and the second current density $J_2$ to be large is applied to the light-emitting element (first light-emitting element) of the red first subpixel RSP1 and the light-emitting element (second light-emitting element) of the red second subpixel RSP2, which constitute the red pixel RPIX provided in the display 1, but the present embodiment is not limited to this example. The above-described driving method that causes the difference between the first current density $J_1$ and the second current density $J_2$ to be large may also be applied to the light-emitting element (first light-emitting element) of the green first subpixel GSP1 and the light-emitting element (second light-emitting element) of the green second subpixel GSP2, which constitute the green pixel GPIX. Further, the above-described driving method that causes the difference between the first current density $J_1$ and the second current density $J_2$ to be large may also be applied to the light-emitting element (first light-emitting element) of the blue first subpixel BSP1 and the light-emitting element (second light-emitting element) of the blue second subpixel BSP2, which constitute the blue pixel BPIX.

From the viewpoint of achieving the power consumption saving in the display 1, the above-described driving method that causes the difference between the first current density $J_1$ and the second current density $J_2$ to be large is preferably applied to all of the red pixel RPIX, the green pixel GPIX, and the blue pixel BPIX, but even when the above-described driving method that causes the difference between the first current density $J_1$ and the second current density $J_2$ to be large is applied to one or two of the red pixel RPIX, the green pixel GPIX, and the blue pixel BPIX, the power consumption saving in the display 1 can be achieved.

Note that, in the first embodiment, as described above, in the relationship between the luminance L and the current density J, an example is described in which the first region R1, the inflection point C, and the second region R2 are present, but no such limitation is intended. For example, a case to be described below is rephrased as a case in which only the first region is present, and the inflection point and the second region are not present.

For example, this is a case in which although, in the relationship between the luminance L and the current density J, the first region R1, the inflection point C, the second region R2 are present, only the first region is used as the current density of the current flowing through the first light-emitting element and the second light-emitting element in the actual driving of the display. In this case, the maximum current density set for the driving of the display is defined as a maximum drive current density, and a region from the current density of 0 to the maximum drive current density is referred to as the first region.

Further, for example, this is a case in which, in the relationship between the luminance L and the current density J, the second region R2 is not present, and as a result of this, only the first region is used as the current density of the current flowing through the first light-emitting element and the second light-emitting element in the actual driving of the display. In this case also, the maximum current density set for the driving of the display is defined as the maximum drive current density, and the region from the current density of 0 to the maximum drive current density is referred to as the first region.

Second Embodiment

Next, a second embodiment of the disclosure will be described with reference to FIG. 8 to FIG. 12. In a display of the present embodiment, compared to the display 1 of the first embodiment described above, the display is different from the first embodiment in that a driving method that can achieve further power consumption saving is applied, but other configurations are the same as described in the first embodiment. For convenience of explanation, components having the same functions as those described in diagrams of the first embodiment are appended with the same reference signs, and descriptions thereof may be omitted.

Figure 8:
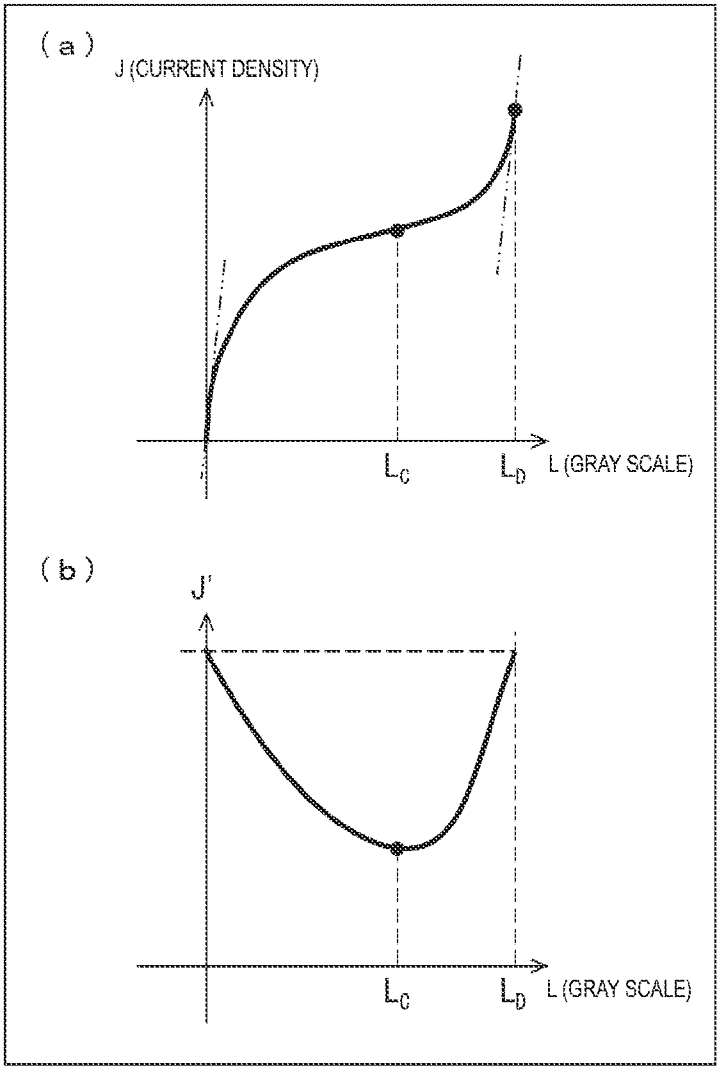
FIG. 8(*a*) and FIG. 8(*b*) are diagrams for describing an example of a driving method for achieving further power consumption saving in a display of a second embodiment.

(a) of FIG. 8 and (b) of FIG. 8 are diagrams for describing an example of the driving method for achieving the further power consumption saving in the display of the second embodiment.

In the display of the second embodiment also, in the same manner as in the first embodiment described above, each of the light-emitting element (first light-emitting element) constituting the red first subpixel RSP1 and the light-emitting element (second light-emitting element) constituting the red second subpixel RSP2 is the QLED having the element characteristics that include, in the relationship between the luminance L and the current density J, the first region R1 in which the luminance L forms the downward convex shape, the second region R2 in which the luminance L forms the upward convex shape and the luminance L is higher than that of the first region R1, and the inflection point C present at the boundary between the first region R1 and the second region R2. Note that the inflection point is included in the first region R1.

(a) of FIG. 8 is a diagram showing the relationship between the luminance L (gray scale) and the current density J of the light-emitting element (first light-emitting element) constituting the red first subpixel RSP1 and the light-emitting element (second light-emitting element) constituting the red second subpixel RSP2 provided in the display of the second embodiment.

As shown in (a) of FIG. 8, a second tangential line of J(L) that is equal to the inclination of a first tangential line of J(L) (indicated by the dotted line in the drawing) when the luminance L (gray scale) is 0 is a tangential line when the luminance L (gray scale) is $L_D$.

J(L) is a function indicating the current density when the luminance (gray scale) is L, and when J(L) is differentiated, J'(L) can be obtained. Thus, $J'(0)=J'(L_D)$ is established.

As shown in (a) of FIG. 8, in the relationship between the luminance L (gray scale) and the current density J of the light-emitting element (first light-emitting element) constituting the red first subpixel RSP1 and the light-emitting element (second light-emitting element) constituting the red second subpixel RSP2 provided in the display of the second embodiment, when $L_C \geq L_D/2$, namely, when the inflection point C at which the first region R1 transitions to the second region R2 is closer to the high luminance side, and the inclination of J(L) on the high luminance side on which the luminance is higher than that of the inflection point C is steeper than the inclination of J(L) on the low luminance side, a driving method described below is preferably applied in order to achieve the power consumption saving.

(1) Low Luminance Region

When the first input image signal and the second input image signal are the signals that average, in the area-weighted manner, the luminance L1 of the light-emitting element (first light-emitting element) constituting the red first subpixel RSP1 and the luminance L2 of the light-emitting element (second light-emitting element) constituting the red second subpixel RSP2 and display the red pixel RPIX at the desired luminance L greater than the lowest gray scale, and the luminance L is greater than 0 and less than half the luminance $L_D$ of a specific point D ($0<L\leq L_D/2$), the first current density $J_1$ is set to 0. When the luminance L is greater than 0 and less than half the luminance $L_D$ of the specific point D ($0<L\leq L_D/2$), in the element characteristics of the second light-emitting element, the second current density $J_2$ is set to a current density (J(2L)) corresponding to the luminance 2L, which is the luminance twice as large as the desired luminance L.

(2) Medium Luminance Region

When the first input image signal and the second input image signal are the signals that average, in the area-weighted manner, the luminance of the light-emitting element (first light-emitting element) constituting the red first subpixel RSP1 and the luminance of the light-emitting element (second light-emitting element) constituting the red second subpixel RSP2 and display the red pixel RPIX at the desired luminance L greater than the lowest gray scale, and the luminance L is greater half the luminance $L_D$ of the specific point D ($L_D/2$) and equal to or less than the luminance $L_C$ of the inflection point C, ($L_D/2<L\leq L_c$), the first current density $J_1$ is set to a current density ($J(L-L_x)$) corresponding to a luminance ($L-L_X$) obtained by subtracting a predetermined luminance ($L_X$) from the desired luminance L, and when the luminance L is greater than half the luminance $L_D$ of the specific point D ($L_D/2$) and equal to or less than the luminance $L_C$ of the inflection point C, ($L_D/2<L\leq L_c$), the second current density $J_2$ is set to a current density ($J(L+L_x)$) corresponding to a luminance ($L+L_X$) obtained by adding the predetermined luminance ($L_X$) to the desired luminance L. However, $L_X$ is a value that satisfies $J'(L-L_x)=J'(L+L_x)$.

(3) High Luminance Region

When the first input image signal and the second input image signal are the signals that average, in the area-weighted manner, the luminance L1 of the light-emitting element (first light-emitting element) constituting the red first subpixel RSP1 and the luminance L2 of the light-emitting element (second light-emitting element) constituting the red second subpixel RSP2 and display the red pixel RPIX at the desired luminance L greater than the lowest gray scale, and the luminance L is greater than the luminance $L_C$ of the inflection point C (high luminance region, $L>L_C$), the first current density $J_1$ and the second current density $J_2$ are set to the current density (J(L)) corresponding to the desired luminance L.

A reason why the further power consumption saving, namely, the maximization of the gain can be achieved by using the driving method described above will be described below.

(b) of FIG. 8 is a diagram showing a relationship between the luminance L (gray scale) and a value (J') obtained as the first derivative of the current density J shown in (a) of FIG. 8.

Figure 9:
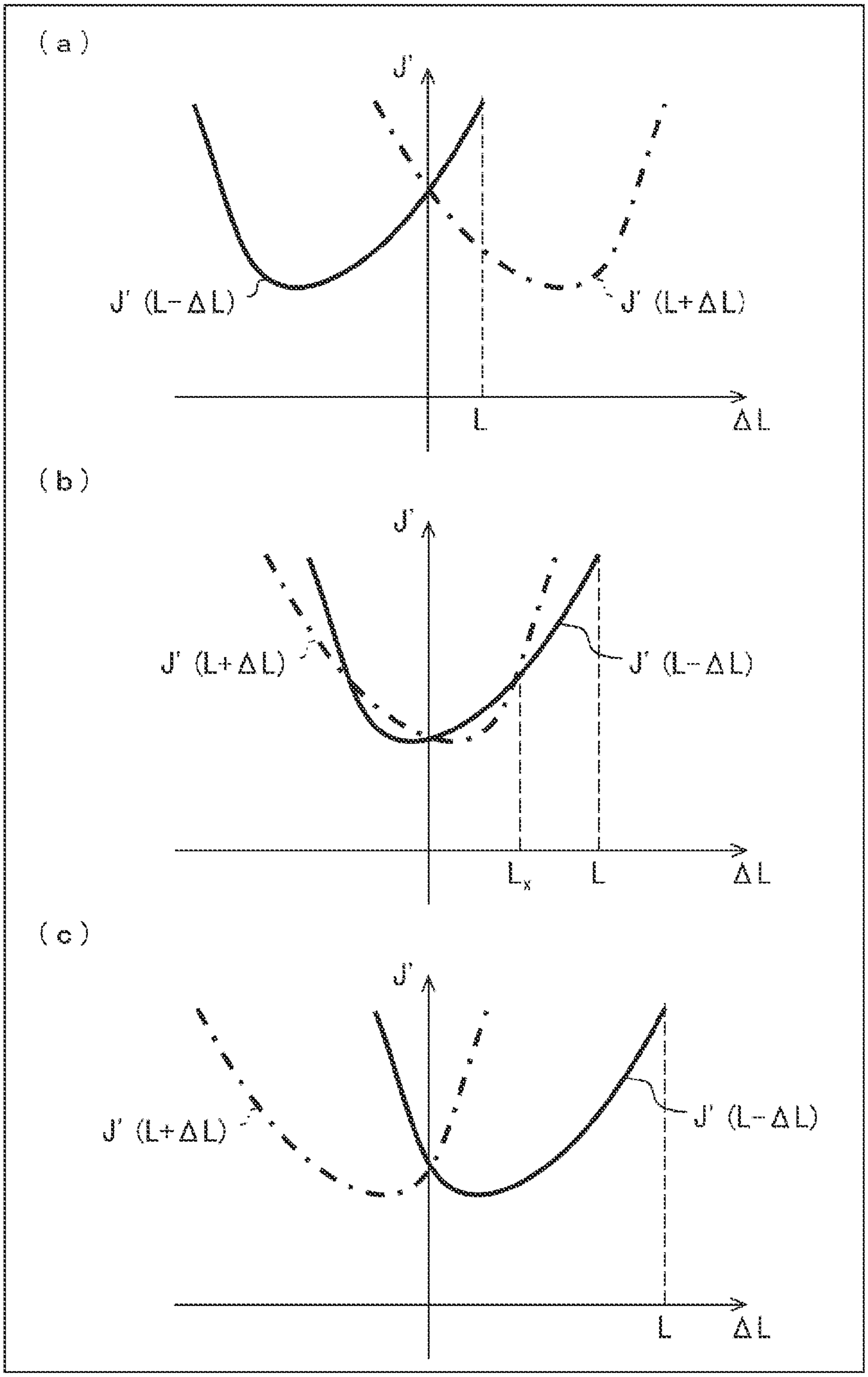
FIG. 9(*a*), FIG. 9(*b*), and FIG. 9(*c*) are diagrams for describing the driving method shown in FIG. 7.

(a) of FIG. 9, (b) of FIG. 9, and (c) of FIG. 9 are diagrams for describing the driving method shown in FIG. 8.

(a) of FIG. 9 is a diagram showing $J'(L-\Delta L)$ and $J'(L+L\Delta)$ with respect to the luminance L in the low luminance region.

(b) of FIG. 9 is a diagram showing $J'(L-\Delta L)$ and $J'(L+L\Delta)$ with respect to the luminance L in the medium luminance region.

(c) of FIG. 9 is a diagram showing $J'(L-\Delta L)$ and $J'(L+L\Delta)$ with respect to the luminance L in the high luminance region.

In the present embodiment, when the first input image signal and the second input image signal are the signals that average, in the area-weighted manner, the luminance L1 of the light-emitting element (first light-emitting element) constituting the red first subpixel RSP1 and the luminance L2 of the light-emitting element (second light-emitting element) constituting the red second subpixel RSP2 and display the red pixel RPIX at the desired luminance L greater than the lowest gray scale, a luminance L1 of the light-emitting element (first light-emitting element) constituting the red first subpixel RSP1 is set so that L1=L−ΔL, and a luminance L2 of the light-emitting element (second light-emitting element) constituting the red second subpixel RSP2 is set so that L2=L+ΔL. However, ΔL is set so that (0≤ΔL≤L).

At this time, a required current value (F(ΔL)) can be obtained by Formula (G) described below.

$$F(\Delta L)=\tfrac{1}{2}[J(L-\Delta L)+J(L+\Delta L)] \quad \text{Formula (G)}$$

Further, a value (F'(ΔL)) obtained by taking the first derivative of this current value (F(ΔL) can be obtained by Formula (H) described below.

$$F'(\Delta L)=\tfrac{1}{2}[-J'(L-\Delta L)+J'(L+\Delta L)] \quad \text{Formula (H)}$$

In this case, in the low luminance region, the medium luminance region, and the high luminance region, by driving the light-emitting element (first light-emitting element) constituting the red first subpixel RSP1 and the light-emitting element (second light-emitting element) constituting the red second subpixel RSP2 as described below, the gain can be maximized.

As shown in (a) of FIG. 9, when the red pixel RPIX is displayed in the low luminance region ($0<L\leq L_D/2$), since J'(L−ΔL)>J'(L+ΔL), F'(ΔL)<0 is established from Formula (H) described above. Thus, the current value F(ΔL) uniformly decreases with respect to ΔL. Thus, when ΔL=L, the current value F (ΔL) becomes smallest. In other words, the gain is maximized at this time. From above, in the low luminance region ($0<L\leq L_D/2$), when $J_1=J(0)=0$ and $J_2=J$ (2L), the gain can be maximized.

As shown in (b) of FIG. 9, when the red pixel RPIX is displayed in the medium luminance region ($L_D/2<L<L_C$), $\Delta L=L_X$ that satisfies J'(L−ΔL)=J'(L+ΔL) is present.

At this time, when $0<\Delta L<L_X$, J'(L−ΔL)=J'(L+ΔL) is established. Thus, from Formula (H) described above, F'(ΔL)<0 is established. On the other hand, when $L_X<\Delta L<L$, J'(L−ΔL)<J'(L+ΔL) is established. Thus, from Formula (H) described above, F'(ΔL)>0 is established.

Thus, when $\Delta L=L_X$, the current value F(ΔL) becomes smallest. In other words, the gain is maximized at this time. From above, in the medium luminance region ($L_D/2<L<L_C$), when $J_1=J(L-L_X)$ and $J_2=(L+_Lx)$, the gain can be maximized.

As shown in (c) of FIG. 9, when the red pixel RPIX is displayed in the high luminance region, ($L_C\leq L$), since J'(L−ΔL)<J'(L+ΔL) is established at the desired luminance L, F'(ΔL)>0 is established from Formula (H) described above. Thus, the current value F(ΔL) uniformly increases with respect to ΔL. Thus, when ΔL=0, the current value F (ΔL) becomes smallest. In other words, the gain is maximized at this time. From above, in the high luminance region ($L_C\leq L$), when $J_1=J(L)$ and $J_2=J(L)$, the gain is maximized.

Figure 10:
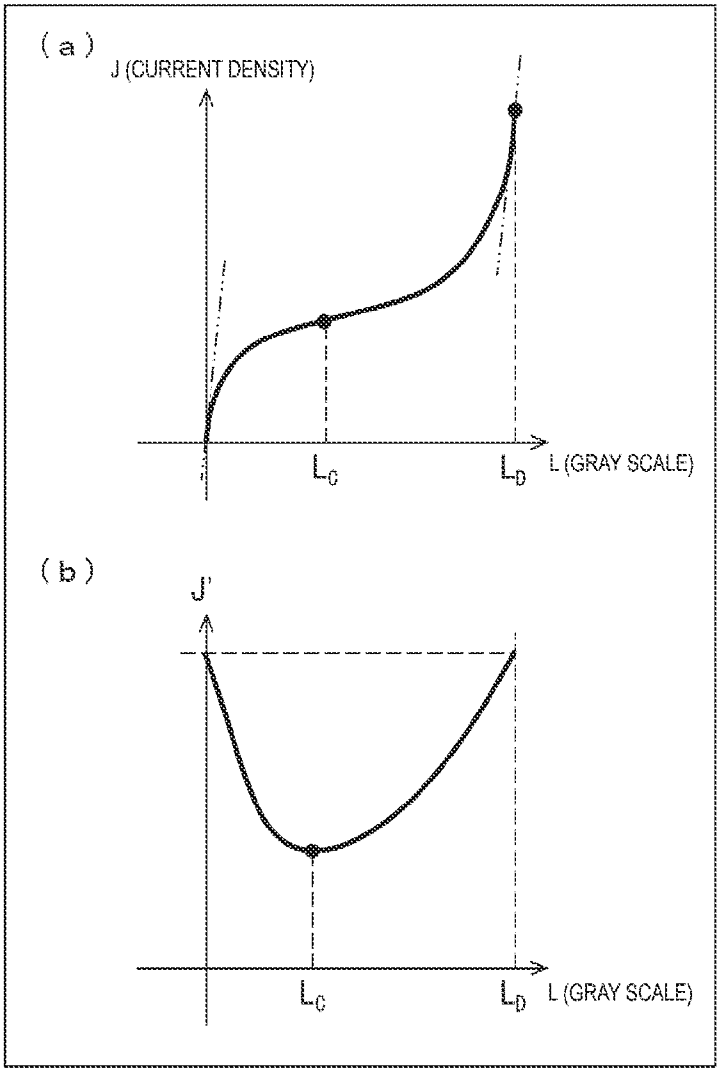
FIG. 10(*a*) and FIG. 10(*b*) are diagrams for describing another example of the driving method for achieving further power consumption saving in the display of the second embodiment.

(a) of FIG. 10 and (b) of FIG. 10 are diagrams for describing another example of the driving method for achieving further power consumption saving in another display of the second embodiment.

(a) of FIG. 10 is a diagram showing the relationship between the luminance L (gray scale) and the current density J of the light-emitting element (first light-emitting element) constituting the red first subpixel RSP1 and the light-emitting element (second light-emitting element) constituting the red second subpixel RSP2 provided in the other display of the second embodiment.

As shown in (a) of FIG. 9, the second tangential line of J(L) that is equal to the inclination of the first tangential line of J(L) (indicated by the dotted line in the drawing) when the luminance L (gray scale) is 0 is a tangential line obtained when the luminance L (gray scale) is $L_D$.

J(L) is the function indicating the current density when the luminance (gray scale) is L, and when J(L) is differentiated, J'(L) can be obtained. Thus, $J'(0)=J'(L_D)$ is established.

As shown in (a) of FIG. 10, in the relationship between the luminance L (gray scale) and the current density J of the light-emitting element (first light-emitting element) constituting the red first subpixel RSP1 and the light-emitting element (second light-emitting element) constituting the red second subpixel RSP2 provided in the other display of the second embodiment, when $L_C<L_D/2$, namely, when the inflection point C at which the first region R1 transitions to the second region R2 is closer to the low luminance side and the inclination of the curved line is steeper on the low luminance side on which the luminance is lower than that of the inflection point C on the high luminance side, a driving method described below is preferably applied in order to achieve the power consumption saving.

(1) Low Luminance Region

When the first input image signal and the second input image signal are the signals that average, in the area-weighted manner, the luminance L1 of the light-emitting element (first light-emitting element) constituting the red first subpixel RSP1 and the luminance L2 of the light-emitting element (second light-emitting element) constituting the red second subpixel RSP2 and display the red pixel RPIX at the desired luminance L greater than the lowest gray scale, and the luminance L is greater than 0 and less than the luminance $L_C$ of the inflection point C ($0<L<L_C$), the first current density $J_1$ is set to 0 and the second current density $J_2$ is set to the current density (J(2L)) corresponding to the luminance 2L, which is the luminance twice as large as the desired luminance L.

(2) Medium Luminance Region

When the first input image signal and the second input image signal are the signals that average, in the area-weighted manner, the luminance L1 of the light-emitting element (first light-emitting element) constituting the red first subpixel RSP1 and the luminance L2 of the light-emitting element (second light-emitting element) constituting the red second subpixel RSP2 and display the red pixel RPIX at the desired luminance L greater than the lowest gray scale, and the luminance L is greater than the luminance $L_C$ of the inflection point C and equal to or less than half the luminance $L_D$ of the specific point D ($L_C<L\leq L_D/2$), in accordance with the values of the luminance L1 and the luminance L2, of a first driving method and a second driving method described below, a driving method that causes (first current density $J_1$+second current density $J_2$)/2 to be smaller than that of the other is selected.

The first driving method is a driving method in which the first current density $J_1$ and the second current density $J_2$ are set to the current density (J(L)) corresponding to the desired luminance L.

The second driving method is a driving method in which the first current density $J_1$ is set to 0 and the second current density $J_2$ is set to the current density (J(2L)) corresponding to the luminance 2L, which is twice as large as the desired luminance L.

(3) High Luminance Region

When the first input image signal and the second input image signal are the signals that average, in the area-weighted manner, the luminance L1 of the light-emitting element (first light-emitting element) constituting the red first subpixel RSP1 and the luminance L2 of the light-emitting element (second light-emitting element) constituting the red second subpixel RSP2 and display the red pixel RPIX at the desired luminance L greater than the lowest gray scale, and the luminance L is greater than half the luminance $L_D$ of the specific point D (high luminance region, $L>L_D/2$), the first current density $J_1$ and the second current density $J_2$ are set to the current density (J(L)) corresponding to the desired luminance L.

A reason why the further power consumption saving, namely, the maximization of the gain can be achieved by using the driving method described above will be described below.

(b) of FIG. 10 is a diagram showing a relationship between the luminance L (gray scale) and the value (J') obtained as the first derivative of the current density J shown in (a) of FIG. 10.

Figure 11:
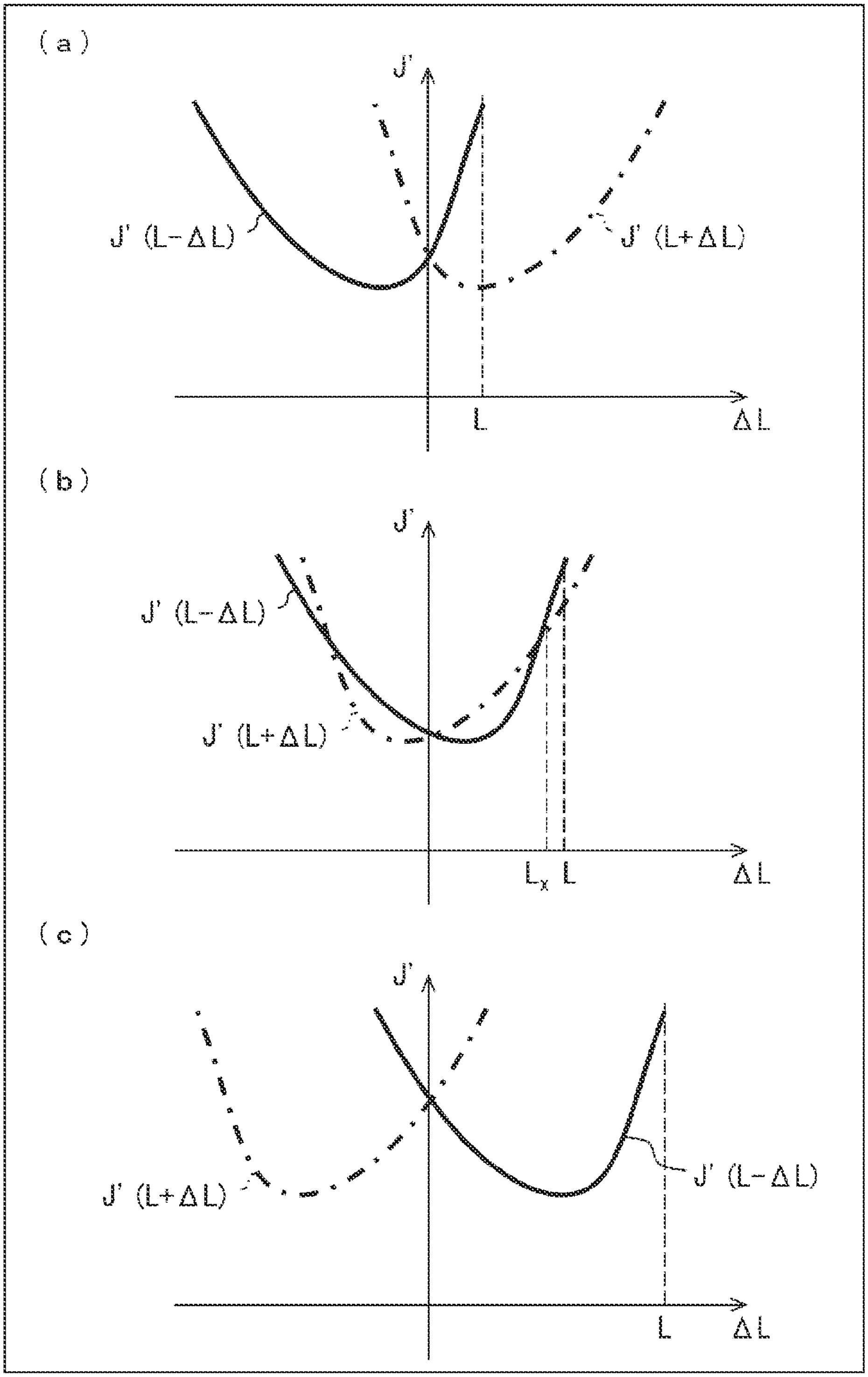
FIG. 11(*a*), FIG. 11(*b*), and FIG. 11(*c*) are diagrams for describing the driving method shown in FIG. 9.

(a) of FIG. 11, (b) of FIG. 11, and (c) of FIG. 11 are diagrams for describing the driving method shown in FIG. 10.

(a) of FIG. 11 is a diagram showing $J'(L-\Delta L)$ and $J'(L+L\Delta)$ with respect to the luminance L in the low luminance region.

(b) of FIG. 11 is a diagram showing $J'(L-\Delta L)$ and $J'(L+L\Delta)$ with respect to the luminance L in the medium luminance region.

(c) of FIG. 11 is a diagram showing $J'(L-\Delta L)$ and $J'(L+L\Delta)$ with respect to the luminance L in the high luminance region.

As shown in (a) of FIG. 11, when the red pixel RPIX is displayed in the low luminance region ($0<L<L_C$), since $J'(L-\Delta L)>J'(L+\Delta L)$ is established, $F'(\Delta L)<0$ is established from Formula (H) described above. Thus, the current value $F(\Delta L)$ uniformly decreases with respect to $\Delta L$. Thus, when $\Delta L=L$, the current value $F(\Delta L)$ becomes smallest. In other words, the gain is maximized at this time. From above, in the low luminance region ($0<L<L_C$), when $J_1=J(0)=0$ and $J_2=J(2L)$, the gain can be maximized.

As shown in (b) of FIG. 11, when the red pixel RPIX is displayed in the medium luminance region ($L_C<L\leq L_D/2$), $\Delta L=L_X$ that satisfies $J'(L-\Delta L)=J'(L+\Delta L)$ is present.

At this time, when $0<\Delta L<L_X$, $J'(L-\Delta L)<J'(L+\Delta L)$ is established. Thus, from Formula (H) described above, $F'(\Delta L)>0$ is established. On the other hand, when $L_X<\Delta L<L$, $J'(L-\Delta L)>J'(L+\Delta L)$ is established. Thus, from Formula (H) described above, $F'(\Delta L)<0$ is established. Thus, when $\Delta L=0$ or $\Delta L=L$, the current value $F(\Delta L)$ becomes smallest. In other words, the gain is maximized at this time. Thus, when one of $\Delta L=0$ and $\Delta L=L$, whichever causes the current value $F(\Delta L)$ to be smaller than that of the other is selected, and the gain can be maximized.

As shown in (c) of FIG. 11, when the red pixel RPIX is displayed in the high luminance region, ($L_C<L$), since $J'(L-\Delta L)<J'(L+\Delta L)$ is established at the desired luminance L, $F'(\Delta L)>0$ is established from Formula (H) described above. Thus, the current value $F(\Delta L)$ uniformly increases with respect to $\Delta L$. Thus, when $\Delta L=0$, the current value $F(\Delta L)$ becomes smallest. In other words, the gain is maximized at this time. From above, in the high luminance region ($L_C\leq L$), when $J_1=J(L)$ and $J_2=J(L)$, the gain is maximized.

Figure 12:
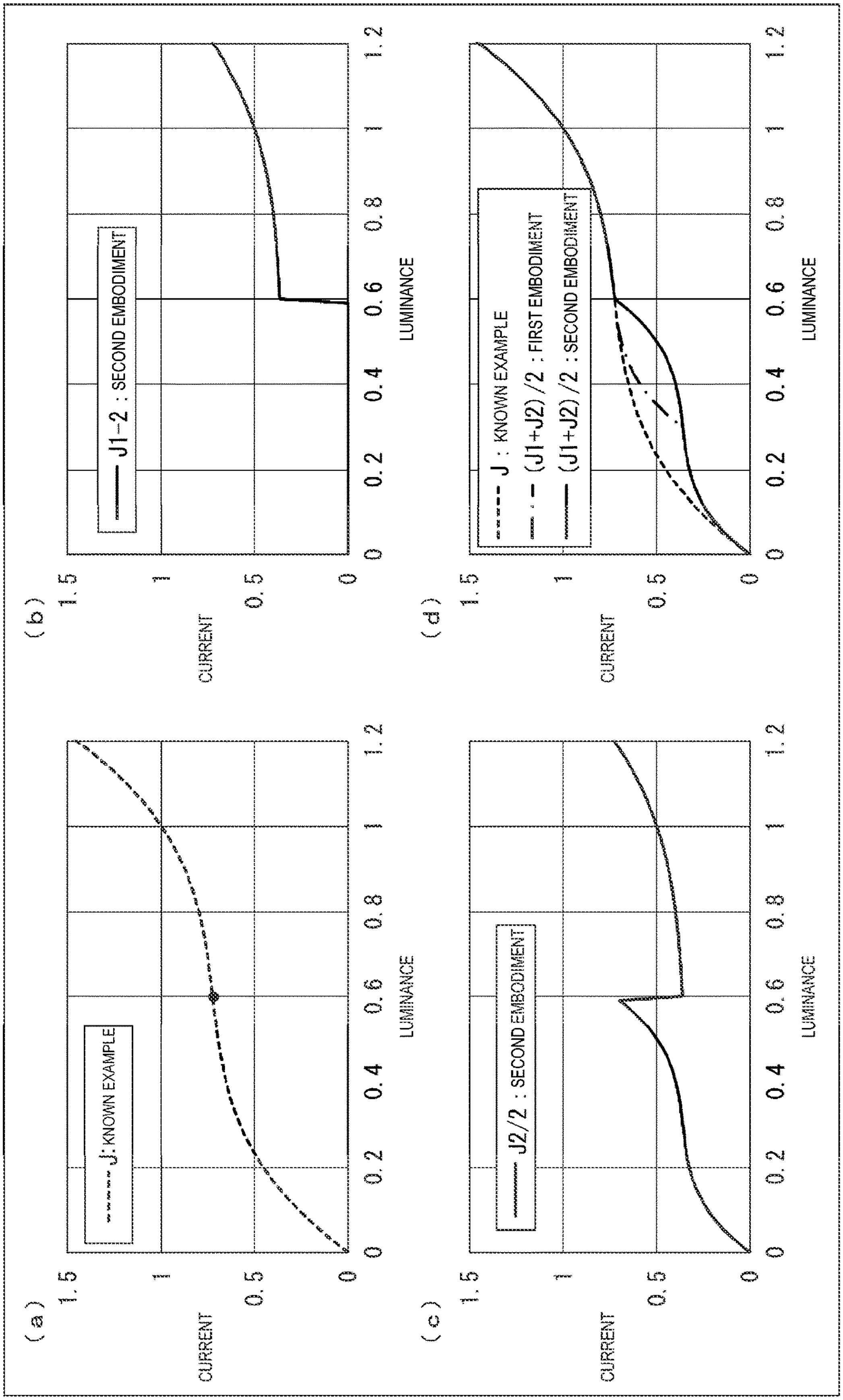
FIG. 12(*a*), FIG. 12(*b*), FIG. 12(*c*), and FIG. 12(*d*) are diagrams for describing a reason why the power consumption can be reduced and the power consumption saving can be achieved in the display of the second embodiment illustrated in FIG. 1 compared to the known display.

(a) of FIG. 12, (b) of FIG. 12, (c) of FIG. 12, and (d) of FIG. 12 are diagrams for describing a reason why the power consumption can be reduced and the power consumption saving can be achieved in the display of the second embodiment compared to the known display.

In (a) of FIG. 12, (b) of FIG. 12, (c) of FIG. 12, and (d) of FIG. 12, values indicating the luminance are normalized so that the maximum value is 1.2 and the minimum value is 0, and values indicating the current are normalized so that the maximum value is 1.5 and the minimum value is 0.

Further, in (a) of FIG. 12, (b) of FIG. 12, (c) of FIG. 12, and (d) of FIG. 12, a value indicating the current is a value obtained as the product of the current density and the area of the pixel or the area of the subpixel.

Note that, in a known example shown in (a) of FIG. 12, the area of one pixel constituting the red pixel RPIX is twice the area of the red first subpixel RSP1 or the area of the red second subpixel RSP2 shown in (b) of FIG. 12 and (c) of FIG. 12.

As shown in (a) of FIG. 12, it can be understood that, in the case of the known example in which the red pixel RPIX is constituted by one light-emitting element, when the red pixel RPIX is displayed at a low luminance or a medium luminance, the required current (current amount) is relatively large.

On the other hand, as shown in (b) of FIG. 12 and (c) of FIG. 12, in the display of the second embodiment, the driving method is applied that can achieve the further power consumption saving, namely, the maximization of the gain as shown from FIG. 8 to FIG. 11.

As shown in (d) of FIG. 12, in the present embodiment, compared to the known example and the first embodiment in which the driving method is applied that can achieve the further power consumption saving, namely, the maximization of the gain, when the red pixel RPIX is displayed at a low luminance or a medium luminance, the required current (current amount) can be reduced.

Thus, according to the display and the driving method of the display of the second embodiment, the further power consumption saving can be achieved.

Note that in the present embodiment, the example is described in which the driving method that can achieve the further power consumption saving, namely, the maximization of the gain is applied to the light-emitting element (first light-emitting element) of the red first subpixel RSP1 and the light-emitting element (second light-emitting element) of the red second subpixel RSP2, which constitute the red pixel RPIX, but the present embodiment is not limited to this example. The above-described driving method that can achieve the further power consumption saving, namely, the maximization of the gain may also be applied to the light-emitting element (first light-emitting element) of the green first subpixel GSP1 and the light-emitting element (second light-emitting element) of the green second subpixel GSP2, which constitute the green pixel GPIX. Further, the above-described driving method that can achieve the further power consumption saving, namely, the maximization of the gain may also be applied to the light-emitting element (first light-emitting element) of the blue first subpixel BSP1 and the light-emitting element (second light-emitting element) of the blue second subpixel BSP2, which constitute the blue pixel BPIX.

From the viewpoint of achieving the power consumption saving in the display, the above-described driving method that can achieve the further power consumption saving, namely, the maximization of the gain is preferably applied to all of the red pixel RPIX, the green pixel GPIX, and the blue pixel BPIX, but even when the above-described driving method that can achieve the further power consumption saving, namely, the maximization of the gain is applied to one or two of the red pixel RPIX, the green pixel GPIX, and the blue pixel BPIX, the power consumption saving in the display can be achieved.

Third Embodiment

Next, a third embodiment according to the disclosure will be described with reference to FIG. 13 to FIG. 15. In a display 10 of the present embodiment, the display 10 is different from the first and second embodiments in that the area of a red first subpixel RSP1' is smaller than the area of a red second subpixel RSP2', and a film thickness of an electron transport layer 13S of a light-emitting element (first light-emitting element) X1 constituting the red first subpixel RSP1' is thicker than a film thickness of an electron transport layer 13L of a light-emitting element (second light-emitting element) X2 constituting the red second subpixel RSP2', but other configurations are the same as those described in the first and second embodiments. For the sake of the description, members having the same functions as the members illustrated in the diagrams in the first and second embodiments are denoted by the same reference numerals, and descriptions thereof will be omitted.

Figure 13:
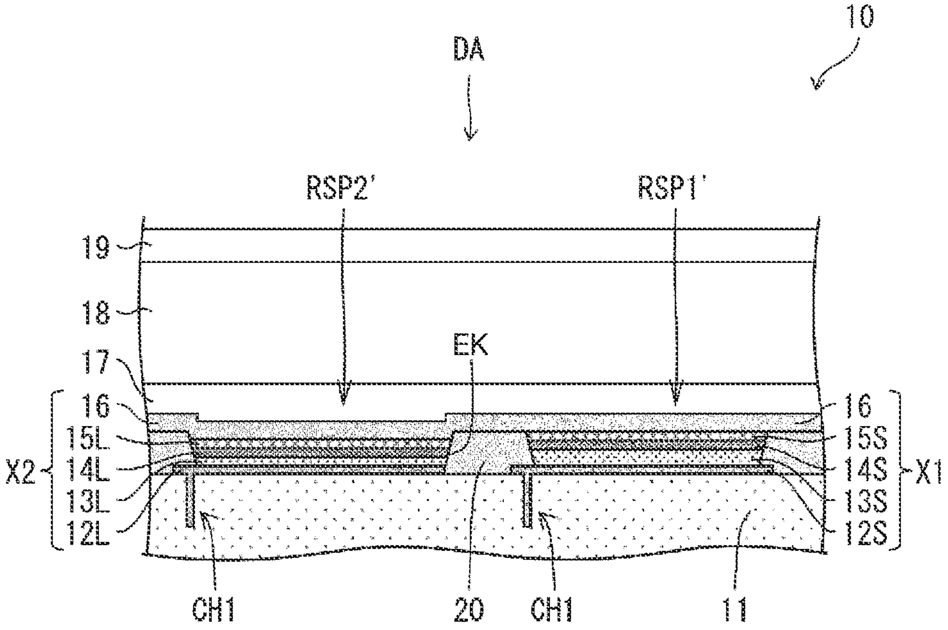
FIG. 13 is a diagram illustrating a part of a display region of a display of a third embodiment.

FIG. 13 is a diagram illustrating a configuration of a part of a display region DA of the display 10.

Figure 14:
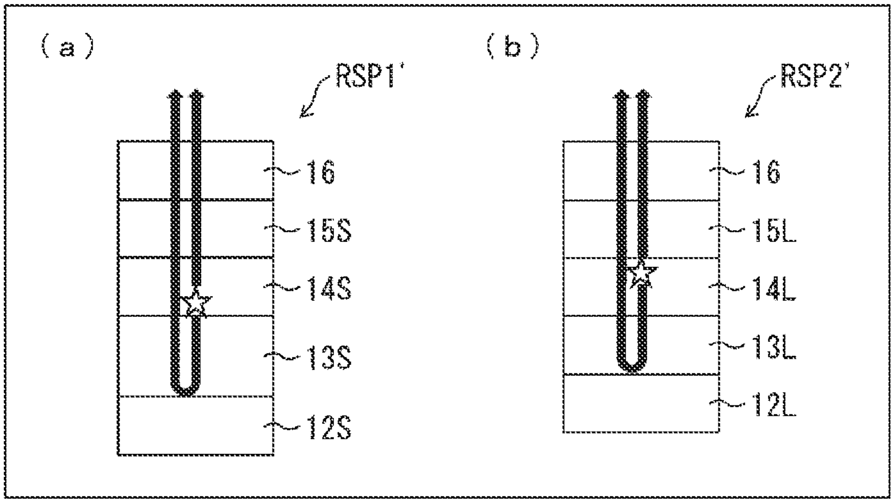
FIG. 14(*a*) is a diagram illustrating a schematic configuration of a light-emitting element constituting a red first subpixel in the display of the third embodiment illustrated in FIG. 13, and FIG. 14(*b*) is a diagram illustrating a schematic configuration of a light-emitting element constituting a red second subpixel in the display of the third embodiment illustrated in FIG. 13.

(a) of FIG. 14 is a diagram illustrating a schematic configuration of the light-emitting element constituting the red first subpixel RSP1' in the display 10 illustrated in FIG. 13, and (b) of FIG. 14 is a diagram illustrating a schematic configuration of the light-emitting element constituting the red second subpixel RSP2' in the display 10 illustrated in FIG. 13.

As illustrated in FIG. 13, the display 10 includes an active matrix substrate 11 including the subpixel circuit SPK (see (b) of FIG. 1), the light-emitting element (first light-emitting element) X1 constituting the red first subpixel RSP1' and the light-emitting element (second light-emitting element) X2 constituting the red second subpixel RSP2', a bank 20 including a side surface EK, and a sealing layer that includes a first inorganic sealing film 17 covering an anode electrode 16, an organic sealing film 18 formed above the first inorganic sealing film 17, and a second inorganic sealing film 19 covering the organic sealing film 18.

In the present embodiment, an example is described in which the sealing layer is formed by three layers made of the inorganic material, the organic material, and the inorganic material, but the present embodiment is not limited to this example. For example, the sealing layer may be formed by a single layer made of an inorganic material or an organic material, may be formed by two layers made of an inorganic material and an organic material, or may be formed by four or more layers.

Further, in the present embodiment, the example is described in which the display 10 is provided with the bank 20, but the display 10 need not necessarily be provided with the bank 20.

As illustrated in FIG. 13 and (a) of FIG. 14, the light-emitting element (first light-emitting element) X1 constituting the red first subpixel RSP1' is constituted by a cathode electrode 12S, the electron transport layer (ETL) 13S, a light-emitting layer 14S containing quantum dot (nanoparticle) phosphors, a hole transport layer (HTL)-cum-hole injection layer (HIL) 15S, and the anode electrode 16, which are layered in this order.

As illustrated in FIG. 13 and (b) of FIG. 14, the light-emitting element (second light-emitting element) X2 constituting the red second subpixel RSP2' is constituted by a cathode electrode 12L, the electron transport layer (ETL) 13L, a light-emitting layer 14L containing quantum dot (nanoparticle) phosphors, a hole transport layer (HTL)-cum-hole injection layer (HIL) 15L, and the anode electrode 16, which are layered in this order.

The cathode electrode 12S and the cathode electrode 12L are formed of the same material so as to have the same film thickness, and the area of the cathode electrode 12L is larger than that of the cathode electrode 12S. Further, in the present embodiment, since the display 10 is a top-emitting type, the cathode electrode 12S and the cathode electrode 12L are formed using a material that can reflect light.

The electron transport layer (ETL) 13S and the electron transport layer (ETL) 13L are formed of the same material, the area of the electron transport layer (ETL) 13L is larger than that of the electron transport layer (ETL) 13S, and the film thickness of the electron transport layer (ETL) 13S is formed to be thicker than that of the electron transport layer (ETL) 13L.

The light-emitting layer 14S and the light-emitting layer 14L are formed of the same material so as to have the same film thickness, and the area of the light-emitting layer 14L is larger than that of the light-emitting layer 14S.

The hole transport layer (HTL)-cum-hole injection layer (HIL) 15S and the hole transport layer (HTL)-cum-hole injection layer (HIL) 15L are formed of the same material so as to have the same film thickness, and the area of the hole transport layer (HTL)-cum-hole injection layer (HIL) 15L is larger than that of the hole transport layer (HTL)-cum-hole injection layer (HIL) 15S. Note that, in the present embodiment, the example is described in which the hole transport layer (HTL)-cum-hole injection layer (HIL) is provided between the light-emitting layer 14S, 14L and the anode electrode 16, but the present embodiment is not limited to this example. Only the hole transport layer (HTL) may be provided between the light-emitting layer 14S, 14L and the anode electrode 16, or only the hole injection layer (HIL) may be provided therebetween.

The anode electrode 16 is formed as a common layer with respect to the light-emitting element (first light-emitting element) X1 constituting the red first subpixel RSP1' and the light-emitting element (second light-emitting element) X2 constituting the red second subpixel RSP2'. Further, in the present embodiment, since the display 10 is the top-emitting type, for example, ITO, which is a transparent conductive material, may be used as the anode electrode 16.

A reason why the configuration of the red first subpixel RSP1' and the configuration of the red second subpixel RSP2', which are illustrated in FIG. 13 and FIG. 14, are incorporated into the display 10 of the present embodiment will be described below.

Typically, in the light-emitting layer containing the quantum dot (nanoparticle) phosphors, the hole mobility is smaller than the electron mobility. Then, since the number of injected positive holes is small in the low current region (first region R1), light is emitted at a position close to the hole transport layer in the light-emitting layer. However, when the current increases, the number of positive holes increases. Thus, the positive holes are also injected at a position further away from the hole transport layer, and the light emission position in the light-emitting layer moves toward the electron transport layer side from the hole transport layer side.

As illustrated by arrows in (a) of FIG. 14 and (b) of FIG. 14, light extracted to the outside of the display 10 is determined by an interference between light emitted by the light-emitting layer 14S, 14L directly toward the anode electrode 16 side, and light emitted by the light-emitting layer 14S, 14L toward the cathode electrode 12S, 12L side, then reflected by the cathode electrode 12S, 12L, and emitted toward the anode electrode 16 side.

The film thickness of the electron transport layer 13L of the red second subpixel RSP2' is set so that the light extraction efficiency is maximized when the light is emitted at a position (indicated by a star mark in (b) of FIG. 14) close to the hole transport layer (HTL)-cum-hole injection layer (HIL) 15L. In other words, since the phase is inverted by 180 degrees when the light is reflected by the cathode electrode 12L, the film thickness of the electron transport layer 13L is adjusted so that a difference between the optical path lengths of two paths is an odd number times of half a wavelength.

On the other hand, as will be described below, since the red first subpixel RSP1' is driven only by a high current density $J_1=J_C$, when the film thickness of the electron transport layer 13S is set to be the same film thickness as that of the electron transport layer 13L of the red second subpixel RSP2', the difference in the optical path lengths becomes smaller. When the electron transport layer 13S of the red first subpixel RSP1' is made thicker so that the difference between the optical path lengths does not change, the light emission luminance of the red first subpixel RSP1' can be made greater than that of the red second subpixel RSP2' at the high current density $J_1=J_C$.

In the present embodiment, as will be described below, although the red first subpixel RSP1' is never driven at a current density other than the high current density $J_1=J_c$, if the red first subpixel RSP1' is driven at a low current density smaller than the high current density $J_1=J_c$, the luminance thereof becomes smaller than that of the red second subpixel RSP2'.

Further, by making the area of the red first subpixel RSP1' smaller by an amount allowed as a result of the improvement in the luminance of the red first subpixel RSP1' at the high current density $J_1=J_C$, the current amount caused to flow can be made smaller while keeping the light flux constant.

For such a reason, in the display 10 of the present embodiment, the area of the red first subpixel RSP1' is formed to be smaller than the area of the second red subpixel RSP2', and the film thickness of the electron transport layer 13S of the light-emitting element (first light-emitting element) X1 constituting the red first subpixel RSP1' is formed to be thicker than the film thickness of the electron transport layer 13L of the light-emitting element (second light-emitting element) X2 constituting the red second subpixel RSP2'.

A driving method of the display 10 of the present embodiment will be described below.

Figure 15:
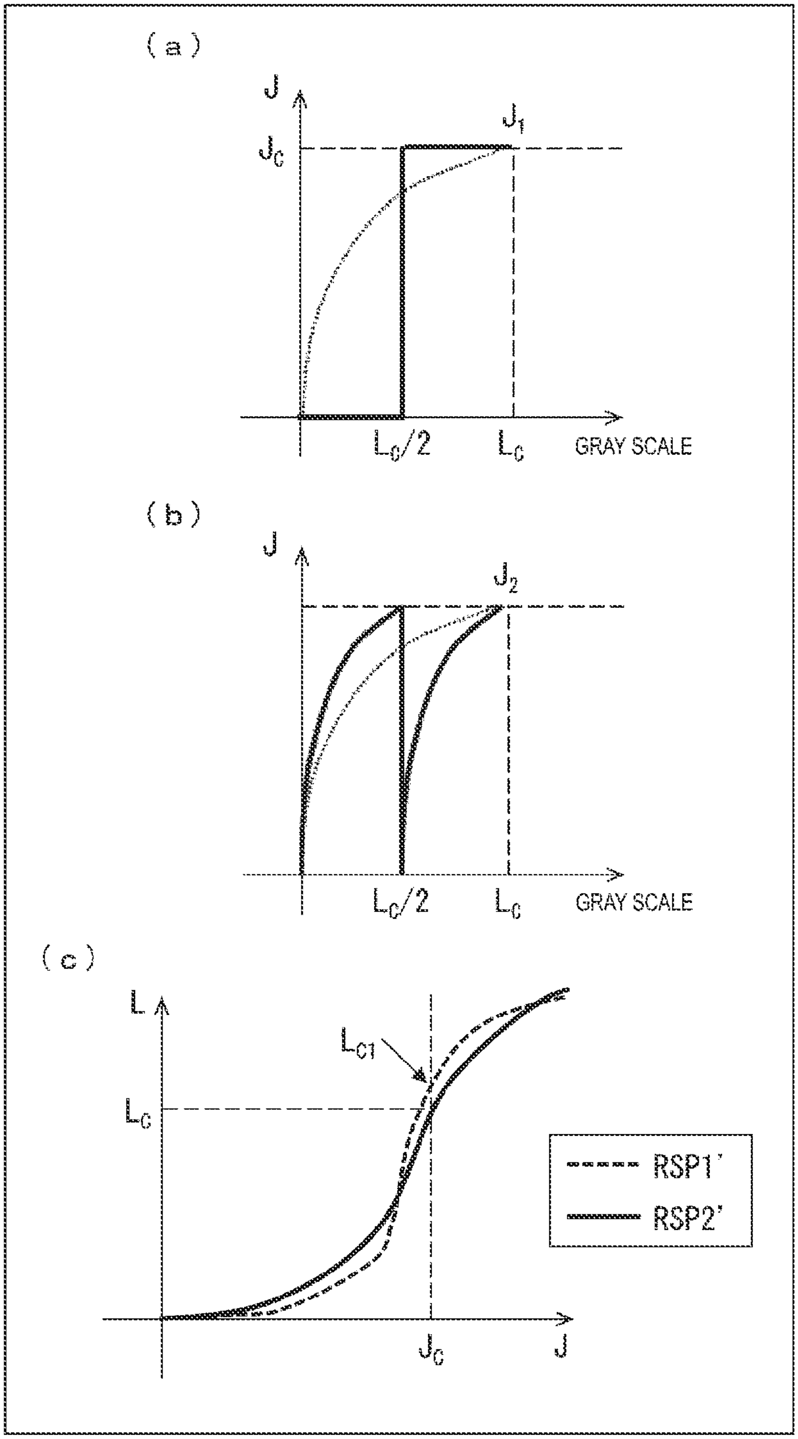
FIG. 15(*a*) is a diagram showing an example of a driving method of the light-emitting element constituting the red first subpixel of the display of the third embodiment illustrated in FIG. 13, FIG. 15(*b*) is a diagram showing an example of a driving method of the light-emitting element constituting the red second subpixel of the display of the third embodiment illustrated in FIG. 13, and FIG. 15(*c*) is a diagram showing element characteristics of each of the light-emitting element constituting the red first subpixel and the light-emitting element constituting the red-second subpixel of the display of the third embodiment illustrated in FIG. 13.

(a) of FIG. 15 is a diagram showing an example of a driving method of the light-emitting element X1 constituting the red first subpixel RSP1' of the display 10, (b) of FIG. 15 is a diagram showing an example of a driving method of the light-emitting element X2 constituting the red second subpixel RSP2' of the display 10, and (c) of FIG. 15 is a diagram showing element characteristics of each of the light-emitting element X1 constituting the red first subpixel RSP1' and the light-emitting element X2 constituting the red-second subpixel RSP2' of the display 10.

As shown in (c) of FIG. 15, the element characteristics of the light-emitting element X1 constituting the red first subpixel RSP1' of the display 10 and the element characteristics of the light-emitting element X2 constituting the red second subpixel RSP2' are different.

(1) Low Luminance Region

As shown in (a) of FIG. 15 and (b) of FIG. 15, when the first input image signal and the second input image signal are the signals that average, in the area-weighted manner, the luminance of the light-emitting element (first light-emitting element) X1 constituting the red first subpixel RSP1' and the luminance of the light-emitting element (second light-emitting element) X2 constituting the red second subpixel RSP2' and display the red pixel RPIX at the desired luminance greater than the lowest gray scale, and the luminance of the light-emitting element X1 and the luminance of the light-emitting element X2 are luminances that fall within the first region R1, a luminance $L_{X1}$ of the light-emitting element X1 is greater than 0 and equal to or less than half the luminance $L_C$ of the inflection point C of the light-emitting element X1 ($0<L_{X1}\leq L_C/2$), and a luminance $L_{x2}$ of the light-emitting element X2 is greater than 0 and equal to or less than half the luminance $L_C$ of the inflection point C of the light-emitting element X2 ($0<L_{X2}\leq L_C/2$), the first current density $J_1$ of the light-emitting element X1 is set to 0, and the second current density $J_2$ of the light-emitting element X2 is set to a current density $J(2L_{X2})$ corresponding to a luminance $2L_{X2}$, which is a luminance twice as large as the luminance $L_{X2}$ of the second light-emitting element X2.

(2) Medium Luminance Region

As shown in (a) of FIG. 15 and (b) of FIG. 15, when the first input image signal and the second input image signal are the signals that average, in the area-weighted manner, the luminance of the light-emitting element (first light-emitting element) X1 constituting the red first subpixel RSP1' and the luminance of the light-emitting element (second light-emitting element) X2 constituting the red second subpixel RSP2' and display the red pixel RPIX at the desired luminance greater than the lowest gray scale, and the luminance of the light-emitting element X1 and the luminance of the light-emitting element X2 are luminances that fall within the first region R1, the luminance $L_{x1}$ of the light-emitting element X1 is greater than half the luminance $L_C$ of the inflection point C of the light-emitting element X1 and equal to or less than the luminance $L_C$ of the inflection point C ($L_C/2<L_{X1}\leq L_C$), and the luminance $L_{x2}$ of the light-emitting element X2 is greater than half the luminance $L_C$ of the inflection point C of the light-emitting element X2 and equal to or less than the luminance $L_C$ of the inflection point C ($L_C/2<L_{X2}\leq L_C$), the first current density $J_1$ of the light-emitting element X1 is set to the current density $J_C$ of the inflection point C, and the second current density $J_2$ of the light-emitting element X2 is set to a current density $J(2L_{X2}-L_C)$ corresponding to a luminance $(2L_{X2}-L_C)$ obtained by subtracting the luminance $L_C$ of the inflection point C of the second light-emitting element X2 from the luminance $2L_{X2}$, which is the luminance twice as large as the luminance $L_{X2}$ of the second light-emitting element X2.

As described above, in the present embodiment, the first current density $J_1$ and the second current density $J_2$ are replaced so that the desired luminance is obtained in the medium luminance region. Further, in the low luminance region and the medium luminance region, the maximum current density of each of the first current density $J_1$ and the second current density $J_2$ is set to a current density with which the maximum luminance becomes $L_C$.

Note that, in the display 10, the luminance $L_{X1}$ of the light-emitting element X1 is greater than the luminance $L_C$ of the inflection point C ($L_C<L_{X1}$), and the luminance $L_{X2}$ of the light-emitting element X2 is greater the luminance $L_C$ of the inflection point C ($L_C<L_{X2}$). In other words, in the high luminance region, the light-emitting elements X1 and X2 are not driven. As described above, the display 10 is a display that performs display using only the low luminance region and the medium luminance region.

In the display 10, when the driving method described above is applied, the first current density $J_1$ flowing through the light-emitting element X1 is either 0 or $J_C$, and since the film thickness of the electron transport layer 13S of the light-emitting element X1 is optimized so that the light extraction efficiency becomes large when the first current density $J_1$ is $J_C$, the power consumption saving in the display 10 can be achieved. In other words, as shown in (c) of FIG.

15, it is possible to cause a luminance $L_{C1}$, of the light-emitting element X1 constituting the red first subpixel RSP1', obtained when the first current density $J_1$ is $J_C$, to be larger than the luminance $L_C$, of the light-emitting element X2 constituting the red second subpixel RSP2', obtained when the second current density $J_2$ is $J_C$. When the area of the red first subpixel RSP1' is reduced by $L_C/L_{C1}$, it is possible to reduce the current flowing through the light-emitting element X1 by $L_C/L_{C1}$, and thus, further power consumption saving can be achieved.

Note that, in the present embodiment, the description is made only about the light-emitting element (first light-emitting element) X1 constituting the red first subpixel RSP1' and the light-emitting element (second light-emitting element) X2 constituting the red second subpixel RSP2', which constitute the red pixel RPIX provided in the display 10, but the present embodiment is not limited thereto. The configuration and the driving method described in the present embodiment can also be applied to the green pixel GPIX and the blue pixel BPIX other than the red pixel RPIX.

From the viewpoint of achieving the power consumption saving in the display 10, the configuration and the driving method described in the present embodiment are preferably applied to all of the red pixel RPIX, the green pixel GPIX, and the blue pixel BPIX, but even when the configuration and the driving method described in the present embodiment are applied to one or two of the red pixel RPIX, the green pixel GPIX, and the blue pixel BPIX, the power consumption saving in the display 10 can be achieved.

Fourth Embodiment

Next, a fourth embodiment of the disclosure will be described with reference to FIG. 16 to FIG. 18. In a display of the present embodiment, the area of the red first subpixel and the area of the red second subpixel RSP2 are different, the red first subpixel and the red second subpixel RSP2 constituting the red pixel RPIX. The display is different from the first and second embodiments with respect to a driving method of the display in which the areas of the subpixels are different in the above-described manner. However, other configurations are the same as those of the first and second embodiments. For the sake of the description, members having the same functions as the members illustrated in the diagrams in the first and second embodiments are denoted by the same reference numerals, and descriptions thereof will be omitted.

In the present embodiment, in order to reduce the current amount for obtaining the desired luminance, a current density J1 and a second current density J2 are determined so that the current sum is a minimum value, the current sum being obtained by adding a first value obtained by multiplying a first current density J1 of the light-emitting element (first light-emitting element) of the red first subpixel by an area (size) A1 of the red first subpixel, and a second value obtained by multiplying a second current density J2 of the light-emitting element (second light-emitting element) of the red second subpixel by an area (size) A2 of the red second subpixel. In other words, when the area A1 of the red first subpixel and the area A2 of the red second subpixel are different, in accordance with the desired luminance, of an embodiment 4A and an embodiment 4B, an embodiment that causes the current sum to be smaller than that of the other is selected.

Here, the subpixel having a larger area is regarded as the red first subpixel (A1>A2), $\alpha$=A1/(A1+A2), and $\beta$=A2/(A1+A2). Note that $0<\beta<\alpha<1$, and $\alpha+\beta=1$.

Further, the current density of the light-emitting element (first light-emitting element) of the red first subpixel is set to the first current density J1, and the current density of the light-emitting element (second light-emitting element) of the red second subpixel is set to the second current density J2. Furthermore, the luminance of the light-emitting element (first light-emitting element) of the red first subpixel is set to L1, and the luminance of the light-emitting element (second light-emitting element) of the red second subpixel is set to L2. In this case, the sum of the current flowing into the light-emitting element (first light-emitting element) of the red first subpixel and the light-emitting element (second light-emitting element) of the red second subpixel is I=A1J1+A2J2. Then, an effective luminance of the red pixel obtained by combining the red first subpixel and the red second subpixel is given by L=$\alpha$L1+$\beta$L2. The embodiment 4A, and the embodiment 4B will be described below.

Embodiment 4A (1) When Low Luminance Region ($0<L\leq\beta L_C$) is Displayed The light-emitting element (first light-emitting element) of the red first subpixel is not illuminated (J1=0, L1=0), and only the light-emitting element (second light-emitting element) of the red second subpixel is driven by a current density J(L/$\beta$) at which the luminance L2 becomes L/$\beta$.

(2) When Medium Luminance Region ($\beta L_C<L\leq L_C$) is Displayed

The light-emitting element (second light-emitting element) of the red second subpixel is driven by the current density $J_C$ so that the luminance thereof is constantly the luminance $L_C$, and an insufficient luminance ($L-\beta L_C$) is compensated for by the light-emitting element (first light-emitting element) of the red first subpixel. In other words, the luminance L1 of the light-emitting element (first light-emitting element) of the red first subpixel is driven by a current density J (($L-\beta L_C$)/$\alpha$) at which the luminance L1 is ($L-\beta L_C$)/$\alpha$.

(3) When High Luminance Region ($L>L_C$) is Displayed

The light-emitting element (first light-emitting element) of the red first subpixel and the light-emitting element (second light-emitting element) of the red second subpixel are both driven by the current density J(L) at which the luminance L is obtained.

Figure 16:
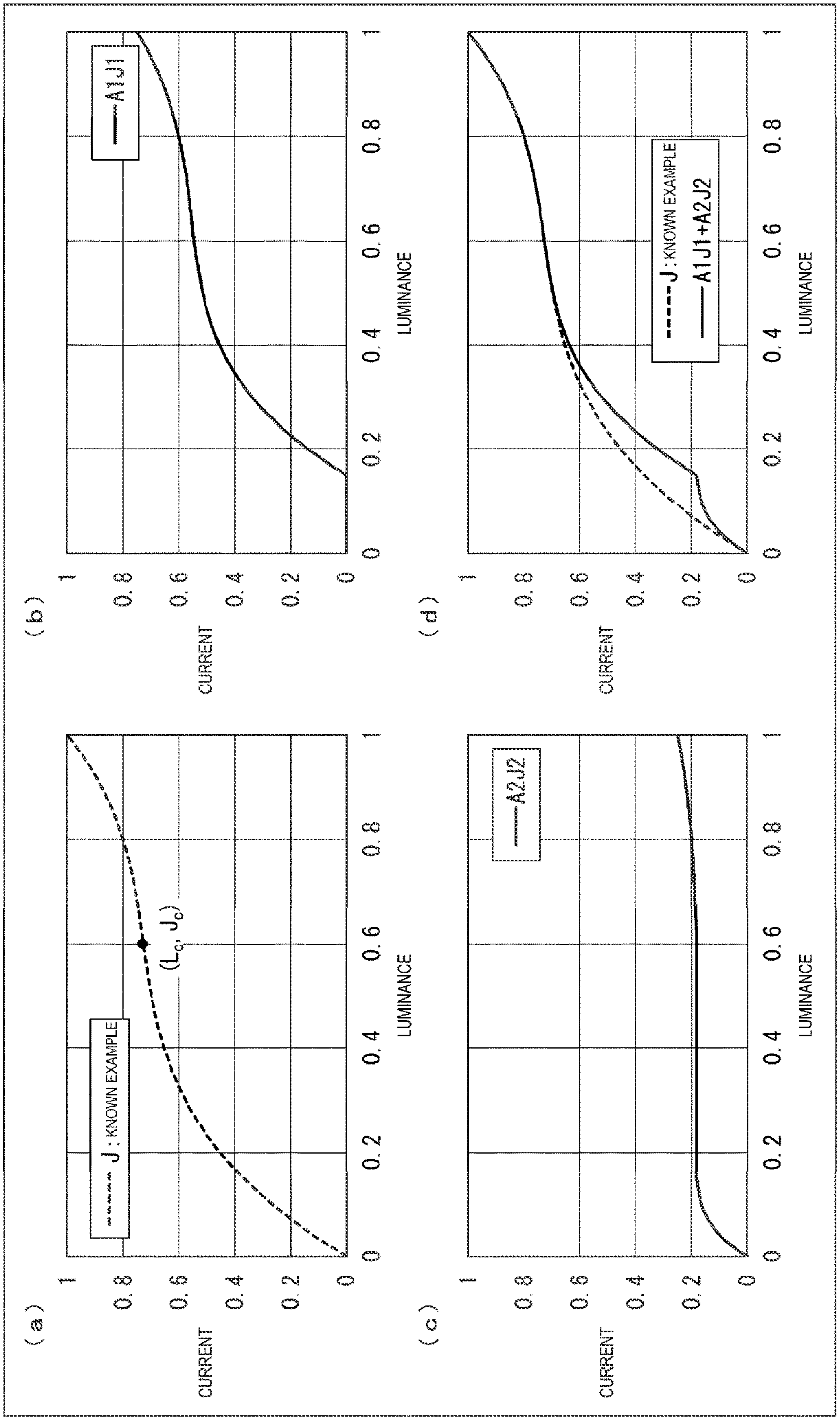
FIG. 16(*a*), FIG. 16(*b*), FIG. 16(*c*), and FIG. 16(*d*) are diagrams for describing a reason why the power consumption can be reduced and the power consumption saving can be achieved in a display of an embodiment 4A compared to the known display.

(a) of FIG. 16, (b) of FIG. 16, (c) of FIG. 16, and (d) of FIG. 16 are diagrams for describing a reason why the power consumption can be reduced and the power consumption saving can be achieved in the display of the embodiment 4A compared to the known display.

In (a) of FIG. 16, (b) of FIG. 16, (c) of FIG. 16, and (d) of FIG. 16, values indicating the luminance and values indicating the current are normalized, and the maximum value thereof is set to 1 and the minimum value thereof is set to 0.

Further, in (a) of FIG. 16, (b) of FIG. 16, (c) of FIG. 16, and (d) of FIG. 16, the value indicating the current is a value obtained as the product of the current density and the area of the pixel or the area of the subpixel.

Note that the area of the red first subpixel shown in (b) of FIG. 16 is 0.75 when the area of the one pixel constituting the red pixel in the known example shown in (a) of FIG. 16 is 1, and the area of the red second subpixel shown in (c) of FIG. 16 is 0.25 when the area of the one pixel constituting the red pixel in the known example shown in (a) of FIG. 16 is 1. In other words, this is a case in which $\alpha$=A1=0.75 and $\beta$=A2=0.25.

As shown in (a) of FIG. 16, it can be understood that in the case of the known example in which the red pixel is constituted by the one light-emitting element, when the red pixel is displayed at a low luminance or a medium luminance, the required current (current amount) is relatively large.

On the other hand, as shown in (b) of FIG. 16 and (c) of FIG. 16, in the display of the present embodiment, since a driving method is applied in which the current is caused to flow only through the light-emitting element (second light-emitting element) constituting the red second subpixel until the second current density J2 flowing through the light-emitting element (second light-emitting element) constituting the red second subpixel reaches the current density $J_C$, and after the light-emitting element (second light-emitting element) constituting the red second subpixel has reached the current density $J_C$, the current is caused to flow through the light-emitting element (first light-emitting element) constituting the red first subpixel until the first current density J1 thereof reaches a current density $J(L-\beta L_C)$, a difference between the first current density J1 and the second current density J2 can be made large.

The area of the red first subpixel and the area of the red second subpixel of the display of the present embodiment are each smaller than the area of the one pixel constituting the red pixel of the known example. Then, in the relationship between the luminance L and the current density J shown in FIG. 3, with respect to the first region R1 (low luminance and medium luminance display region) in which the luminance L forms the line having the downward convex shape, as described above, the driving method is applied that causes the difference between the first current density J1 and the second current density J2 to be large. Thus, as shown in (d) of FIG. 16, compared to the known example, when the red pixel is displayed at a low luminance or a medium luminance, the required current (current amount) can be reduced.

Thus, according to the display and the driving method of the display described above, the power consumption saving can be achieved.

Embodiment 4B

In the embodiment 4B, driving is performed with the roles of the light-emitting element (first light-emitting element) constituting the red first subpixel and the light-emitting element (second light-emitting element) constituting the red second subpixel in the embodiment 4A described above being replaced.

(1) When Low Luminance Region ($0<L\leq\alpha L_C$) is Displayed

The light-emitting element (second light-emitting element) of the red second subpixel is not illuminated (J2=0, L2=0), and only the light-emitting element (first light-emitting element) of the red first subpixel is driven by the current density $J(L/\alpha)$ at which the luminance L1 becomes $L/\alpha$.

(2) When Medium Luminance Region ($\alpha L_C<L<L_C$) is Displayed

The light-emitting element (first light-emitting element) of the red first subpixel is driven by the current density $J_C$ so that the luminance thereof is constantly the luminance $L_C$, and an insufficient luminance $(L-\alpha L_C)$ is compensated for by the light-emitting element (second light-emitting element) of the red second subpixel. In other words, the driving is performed at a current density $J(L-\alpha L_C)/\beta)$ at which the luminance L2 of the light-emitting element (second light-emitting element) of the red second subpixel is $((L-\alpha L_C)/\beta)$.

(3) When High Luminance Region ($L<L_C$) is Displayed

The light-emitting element (first light-emitting element) of the red first subpixel and the light-emitting element (second light-emitting element) of the red second subpixel are both driven by the current density J(L) at which the luminance L is obtained.

Figure 17:
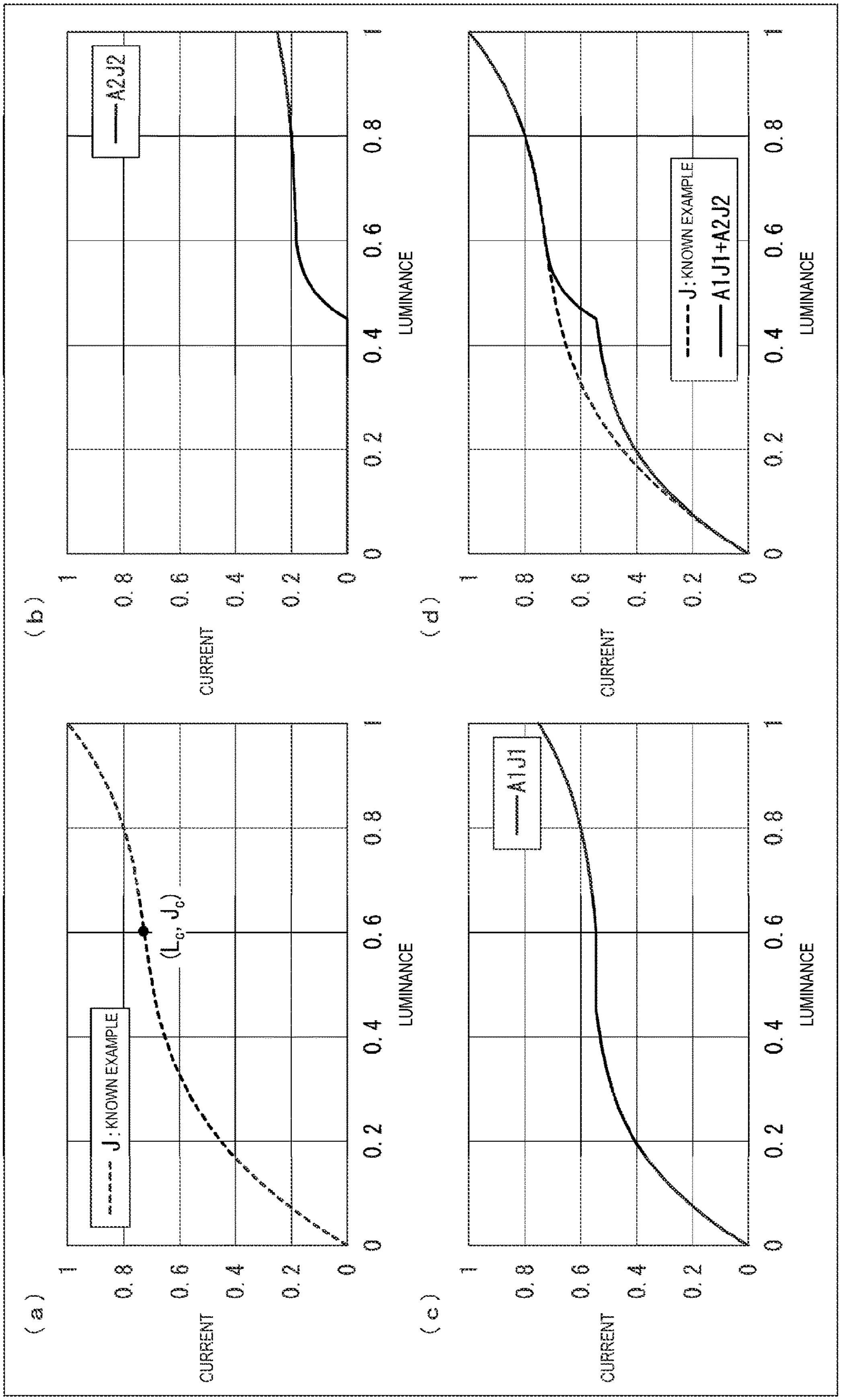
FIG. 17(*a*), FIG. 17(*b*), FIG. 17(*c*), and FIG. 17(*d*) are diagrams for describing a reason why the power consumption can be reduced and the power consumption saving can be achieved in a display of an embodiment 4B compared to the known display.

(a) of FIG. 17, (b) of FIG. 17, (c) of FIG. 17, and (d) of FIG. 17 are diagrams for describing a reason why the power consumption can be reduced and the power consumption saving can be achieved in the display of the embodiment 4B compared to the known display.

In (a) of FIG. 17, (b) of FIG. 17, (c) of FIG. 17, and (d) of FIG. 17, values indicating the luminance and values indicating the current are normalized, and the maximum value thereof is set to 1 and the minimum value thereof is set to 0.

Further, in (a) of FIG. 17, (b) of FIG. 17, (c) of FIG. 17, and (d) of FIG. 17, the value indicating the current is a value obtained as the product of the current density and the area of the pixel or the area of the subpixel.

Note that the area of the red first subpixel shown in (b) of FIG. 17 is 0.25 when the area of the one pixel constituting the red pixel in the known example shown in (a) of FIG. 17 is 1, and the area of the red second subpixel shown in (c) of FIG. 17 is 0.75 when the area of the one pixel constituting the red pixel in the known example shown in (a) of FIG. 17 is 1. In other words, this is a case in which $\alpha$=A1=0.75 and $\beta$=A2=0.25.

As shown in (a) of FIG. 17, it can be understood that in the case of the known example in which the red pixel is constituted by the one light-emitting element, when the red pixel is displayed at a low luminance or a medium luminance, the required current (current amount) is relatively large.

On the other hand, as shown in (b) of FIG. 17 and (c) of FIG. 17, in the display of the present embodiment, since a driving method is applied in which the current is caused to flow only through the light-emitting element (first light-emitting element) constituting the red first subpixel until the first current density J1 flowing through the light-emitting element (first light-emitting element) constituting the red first subpixel reaches the current density $J_C$, and after the light-emitting element (first light-emitting element) constituting the red first subpixel has reached the current density $J_C$, the current is caused to flow through the light-emitting element (second light-emitting element) constituting the red second subpixel until the second current density J2 thereof reaches a current density $J((L-\alpha L_C)/\beta)$, the difference between the first current density J1 and the second current density J2 can be made large.

The area of the red first subpixel and the area of the red second subpixel of the display of the present embodiment are each smaller than the area of the one pixel constituting the red pixel of the known example. Then, in the relationship between the luminance L and the current density J shown in FIG. 3, with respect to the first region R1 (low luminance and medium luminance display region) in which the luminance L forms the line having the downward convex shape, as described above, the driving method is applied that causes the difference between the first current density J1 and the second current density J2 to be large. Thus, as shown in (d) of FIG. 17, compared to the known example, when the red pixel is displayed at a low luminance or a medium luminance, the required current (current amount) can be reduced.

Thus, according to the display and the driving method of the display described above, the power consumption saving can be achieved.

In the present embodiment, by using a driving method obtained by combining the driving method used in the display of the embodiment 4A shown in FIG. 16 and the driving method used in the display of the embodiment 4B shown in FIG. 17, further power consumption saving is achieved.

Figure 18:
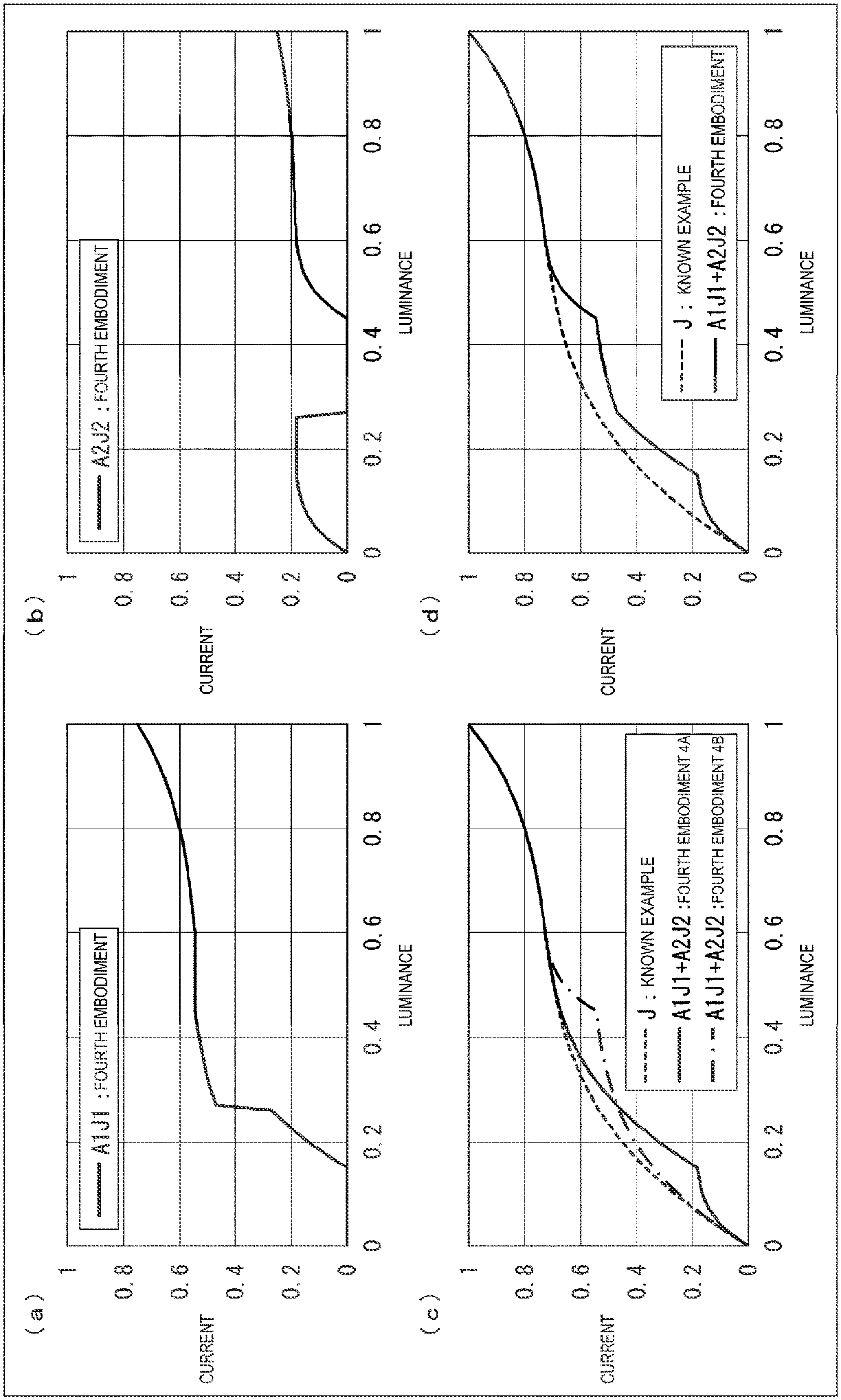
FIG. 18(*a*), FIG. 18(*b*), FIG. 18(*c*), and FIG. 18(*d*) are diagrams for describing a reason why the power consumption can be further reduced and further power consumption saving can be achieved in the display of the fourth embodiment using a driving method obtained by combining the driving method used in the display of the embodiment 4A shown in FIG. 16 and the driving method used in the display of the embodiment 4B shown in FIG. 17, while comparing the display of the embodiment 4A and the display of the embodiment 4B.
Figure 19:
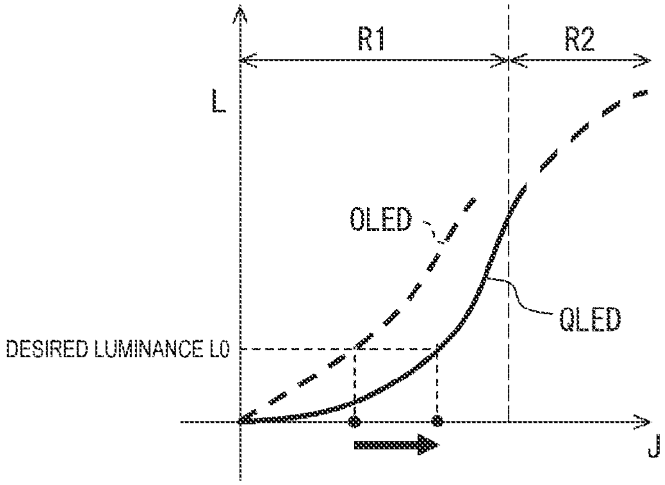
FIG. 19 is a diagram illustrating a relationship between a luminance L and a current density J of a QLED and an OLED.

(a) of FIG. 18, (b) of FIG. 18, (c) of FIG. 18, and (d) of FIG. 18 are diagrams for describing a reason why the power consumption can be further reduced and further power consumption saving can be achieved in the display of the fourth embodiment using the driving method obtained by combining the driving method used in the display of the embodiment 4A shown in FIG. 16 and the driving method used in the display of the embodiment 4B shown in FIG. 17, compared to the display of the embodiment 4A and the display of the embodiment 4B.

As shown in (d) of FIG. 18, in a region in which a curved line, indicating a relationship between values indicating the luminance and values indicating the current, forms an upward convex shape, namely, in a region in which the values indicating the luminance is $0 \leq L \leq 0.6$, the larger the current density, the higher the luminous efficiency (L/J) becomes. Thus, when the driving is performed at a highest possible current density, a greater power consumption saving can be achieved.

Thus, as shown in (a) of FIG. 18 and (b) of FIG. 18, in the low luminance region ($0 \leq L < 0.27$), first, only the light-emitting element (second light-emitting element) constituting the red second subpixel, which is a smaller subpixel, is driven, and when the luminance becomes insufficient, the light-emitting element (first light-emitting element) constituting the red first subpixel, which is a larger subpixel, is driven. This driving method is the driving method of the embodiment 4A. By employing such a driving method, since the current density of the light-emitting element (second light-emitting element) constituting the red second subpixel, which is the smaller subpixel, can be increased, the power consumption saving can be achieved.

Further, as shown in (a) of FIG. 18 and (b) of FIG. 18, a point in time at which the driving method of the embodiment 4A is switched to the driving method of the fourth Embodiment (B) is when the value indicating the luminance is 0.27. In a region in which $0.27 \leq L$, the light-emitting element (second light-emitting element) constituting the red second subpixel, which is the smaller subpixel, is not driven, and the current is collected in the light-emitting element (first light-emitting element) constituting the red-first subpixel, which is the larger subpixel. In this way, the current density of the larger subpixel can be increased, and thus the power consumption saving can be achieved.

In the display of the fourth embodiment, shown in (d) of FIG. 18, using the driving method obtained by combining the driving method used in the display of the embodiment 4A and the driving method used in the display of the embodiment 4B, the power consumption can be further reduced and further power consumption saving can be achieved, compared to the known example, the display of the embodiment 4A, and the display of the fourth Embodiment (B) shown in (c) of FIG. 18.

Note that, in the present embodiment, the description is made only about the light-emitting element (first light-emitting element) of the red first subpixel and the light-emitting element (second light-emitting element) of the red second subpixel, which constitute the red pixel, but the present embodiment is not limited thereto. The driving method described in the present embodiment can also be applied to the green pixel and the blue pixel other than the red pixel.

From the viewpoint of achieving the power consumption saving in the display, the driving method described in the present embodiment is preferably applied to all of the red pixel, the green pixel, and the blue pixel, but even when the driving method described in the present embodiment is applied to one or two of the red pixel, the green pixel, and the blue pixel, the power consumption saving in the display can be achieved.

Supplement

First Aspect

A driving method of a display is provided, the display including a first subpixel and a second subpixel constituting a pixel, a first light-emitting element constituting the first subpixel, a second light-emitting element constituting the second subpixel, a first drive unit configured to control a current density of a current flowing through the first light-emitting element, a second drive unit configured to control a current density of a current flowing through the second light-emitting element, and a controller configured to input a data signal to the first drive unit and the second drive unit. Each of the first light-emitting element and the second light-emitting element has element characteristics having, in a relationship between luminance and current density, a first region in which a luminance forms a downward convex shape. The controller causes a current of a first current density to flow into the first light-emitting element by inputting a data signal of a first gray scale value to the first drive unit and causes the first light-emitting element to emit light at a first luminance, and the controller causes a current of a second current density to flow into the second light-emitting element by inputting a data signal of a second gray scale value to the second drive unit and causes the second light-emitting element to emit light at a second luminance. When the first luminance and the second luminance are luminances included in the first region, the first gray scale value is smaller than the second gray scale value.

Second Aspect

In the driving method of the display according to the first aspect, when the data signal of the first gray scale value and the data signal of the second gray scale value are signals configured to average, in an area-weighted manner, a luminance of the first light-emitting element and a luminance of the second light-emitting element and to display the pixel at a desired luminance greater than a lowest gray scale, and in the element characteristics of each of the first light-emitting element and the second light-emitting element, when the luminance of the first light-emitting element and the luminance of the second light-emitting element are the luminances included in the first region, driving is performed to cause an area-weighted average of the first luminance and the second luminance to be equal to the desired luminance.

Third Aspect

In the driving method of the display according to the second aspect, a size of the first subpixel is from 0.95 times to 1.05 times a size of the second subpixel, and the element characteristics of the first light-emitting element and the element characteristics of the second light-emitting element are identical.

Fourth Aspect

In the driving method of the display according to the third aspect, the first current density is a current density included in the first region, and the second current density is a current density included in the first region.

Fifth Aspect

In the driving method of the display according to the third aspect, when, in the element characteristics of each of the first light-emitting element and the second light-emitting element, the luminance of the first light-emitting element and the luminance of the second light-emitting element are the luminances included in the first region, a maximum current density of the first region is set as a maximum drive current density, the luminance of the first light-emitting element is greater than 0 and smaller than half a luminance of the maximum drive current density, and the luminance of the second light-emitting element is greater than 0 and smaller than half the luminance of the maximum drive current density, the first current density is 0, and the second current density is a current density corresponding to a luminance twice as large as the desired luminance, in the element characteristics of the second light-emitting element.

Sixth Aspect

In the driving method of the display according to the third aspect, when, in the element characteristics of each of the first light-emitting element and the second light-emitting element, the luminance of the first light-emitting element and the luminance of the second light-emitting element are the luminances included in the first region, a maximum current density of the first region is set as a maximum drive current density, the luminance of the first light-emitting element is greater than half a luminance of the maximum drive current density and smaller than the luminance of the maximum drive current density, and the luminance of the second light-emitting element is greater than half the luminance of the maximum drive current density and smaller than the luminance of the maximum drive current density of the second light-emitting element, the second current density is the maximum drive current density, in the element characteristics of the second light-emitting element, and the first current density is a current density corresponding to a luminance obtained by subtracting the luminance of the maximum drive current density from a luminance twice as large as the desired luminance, in the element characteristics of the first light-emitting element.

Seventh Aspect

In the driving method of the display according to the second aspect, when the data signal of the first gray scale value and the data signal of the second gray scale value are signals configured to display the pixel at a luminance of the lowest gray scale, or the signals configured to average, in the area-weighted manner, the luminance of the first light-emitting element and the luminance of the second light-emitting element and to display the pixel at the desired luminance greater than the lowest gray scale, in the element characteristics of each of the first light-emitting element and the second light-emitting element, in addition to the first region, the element characteristics have a second region in which the luminance forms an upward convex shape and the luminance is higher than the luminance of the first region, and an inflection point present at a boundary between the first region and the second region, and the luminance of the first light-emitting element and the luminance of the second light-emitting element are luminances included in the second region, each of the current density of the current flowing through the first light-emitting element and the current density of the current flowing through the second light-emitting element is caused to be a third current density, and driving is performed to cause each of the luminance of the first light-emitting element corresponding to the third current density and the luminance of the second light-emitting element corresponding to the third current density to be equal to the desired luminance.

Eighth Aspect

In the driving method of the display according to the seventh aspect, when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is defined as a luminance ($L_D$) of a specific point, a luminance of the inflection point in the element characteristics of the first light-emitting element is equal to or greater than half the luminance of the specific point ($L_D/2$) in the element characteristics of the first light-emitting element, and a luminance of the inflection point in the element characteristics of the second light-emitting element is equal to or greater than half the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are the luminances included in the first region, the luminance of the first light-emitting element is greater than 0 and equal to or less than half the luminance of the specific point ($L_D/2$) in the element characteristics of the first light-emitting element, and the luminance of the second light-emitting element is greater than 0 and equal to or less than half the luminance of the specific point ($L_D/2$) in the element characteristics of the second light-emitting element, the first current density is 0, and the second current density is a current density corresponding to a luminance twice as large as the desired luminance, in the element characteristics of the second light-emitting element.

Ninth Aspect

In the driving method of the display according to the seventh aspect, when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is defined as a luminance ($L_D$) of a specific point, a luminance of the inflection point in the element characteristics of the first light-emitting element is equal to or greater than half of the luminance of the specific point ($L_D/2$) in the element characteristics of the first light-emitting element, and a luminance of the inflection point in the element characteristics of the second light-emitting element is equal to or greater than half of the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are the luminances included in the first region, the luminance of the first light-emitting element is greater than half of the luminance of the specific point ($L_D/2$) in the element characteristics of the first light-emitting element and equal to or less than the luminance of the inflection point in the element characteristics of the first light-emitting element, and the luminance of the second light-emitting element is greater than half of the luminance of the specific point ($L_D/2$) in the element characteristics of the second light-emitting element and equal to or less than the luminance of the inflection point in the element characteristics of the second light-emitting element, the first current density is a current density corresponding to a luminance obtained by subtracting a predetermined luminance ($L_X$) from the desired luminance, in the element characteristics of the first light-emitting element, and the second current density is a current density corresponding to a luminance obtained by adding the predetermined luminance ($L_X$) to the desired luminance, in the element characteristics of the second light-emitting element.

Tenth Aspect

In the driving method of the display according to the seventh aspect, when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is a luminance ($L_D$) of a specific point, a luminance of the inflection point in the element characteristics of the first light-emitting element is less than half the luminance of the specific point ($L_D/2$) in the element characteristics of the first light-emitting element, and a luminance of the inflection point in the element characteristics of the second light-emitting element is less than half the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are the luminances included in the first region, the luminance of the first light-emitting element is greater than 0 and less than the luminance of the inflection point, in the element characteristics of the first light-emitting element, and the luminance of the second light-emitting element is greater than 0 and less the luminance of the inflection point, in the element characteristics of the second light-emitting element, the first current density is 0, and the second current density is a current density corresponding to a luminance twice as large as the desired luminance, in the element characteristics of the second light-emitting element.

Eleventh Aspect

In the driving method of the display according to the seventh aspect, when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is defined as a luminance ($L_D$) of a specific point, a luminance of the inflection point in the element characteristics of the first light-emitting element is less than half the luminance of the specific point ($L_D/2$) in the element characteristics of the first light-emitting element, and a luminance of the inflection point in the element characteristics of the second light-emitting element is less than half the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are luminances included in the second region, the luminance of the first light-emitting element is greater than the luminance of the inflection point in the element characteristics of the first light-emitting element and equal to or less than half the luminance of the specific point ($L_D/2$) in the element characteristics of the first light-emitting element, and the luminance of the second light-emitting element is greater than the luminance of the inflection point in the element characteristics of the second light-emitting element and equal to or less than half the luminance of the specific point ($L_D/2$) in the element characteristics of the second light-emitting element, the first current density is 0, and the second current density is a current density corresponding to a luminance twice as large as the desired luminance, in the element characteristics of the second light-emitting element.

Twelfth Aspect

In the driving method of the display according to the seventh aspect, a size of the second subpixel is greater than a size of the first subpixel, and a film thickness of an electron transport layer provided at the first light-emitting element is greater than a film thickness of an electron transport layer provided at the second light-emitting element. When, in the element characteristics of each of the first light-emitting element and the second light-emitting element, the luminance of the first light-emitting element and the luminance of the second light-emitting element are the luminances included in the first region, the luminance of the first light-emitting element is greater than 0 and equal to or less than half the luminance of the inflection point in the element characteristics of the first light-emitting element, and the luminance of the second light-emitting element is greater than 0 and equal to or less than half the luminance of the inflection point in the element characteristics of the second light-emitting element, the first current density is 0, and the second current density is a current density corresponding to a luminance twice as large as the luminance of the second light-emitting element, in the element characteristics of the second light-emitting element. When the luminance of the first light-emitting element is greater than half the luminance of the inflection point in the element characteristics of the first light-emitting element and less than the luminance of the inflection point in the element characteristics of the first light-emitting element, and the luminance of the second light-emitting element is greater than half the luminance of the inflection point in the element characteristics of the second light-emitting element and less than the luminance of the inflection point in the element characteristics of the second light-emitting element, the first current density is a current density of the inflection point in the element characteristics of the first light-emitting element, and the second current density is a current density corresponding to a luminance obtained by subtracting the luminance of the inflection point in the element characteristics of the second light-emitting element from a luminance twice as large as the desired luminance in the element characteristics of the second light-emitting element.

Thirteenth Aspect

In the driving method of the display according to the first or second aspect, a size of the first subpixel and a size of the second subpixel are different, and the first current density and the second current density are determined to cause a current sum to be a minimum value, the current sum being obtained by combining a first value obtained by multiplying the first current density by the size of the first subpixel and a second value obtained by multiplying the second current density by the size of the second subpixel.

Fourteenth Aspect

A display includes a first subpixel and a second subpixel constituting a pixel, a first light-emitting element constituting the first subpixel, a second light-emitting element constituting the second subpixel, a first pixel circuit corresponding to the first subpixel, a second pixel circuit corresponding to the second subpixel, and a drive unit configured to supply a first data signal to the first pixel circuit and a second data signal to the second pixel circuit. Each of the first light-emitting element and the second light-emitting element has element characteristics having, in a relationship between luminance and current density, a first region in which a luminance forms a downward convex shape, a second region in which the luminance forms an upward convex shape and the luminance is higher than the luminance of the first region, and an inflection point present at a boundary between the first region and the second region. The first data signal is configured to cause a current of a first current density to flow through the first light-emitting element and to cause the first light-emitting element to emit light at a first luminance, and the second data signal is configured to cause a current of a second current density to flow through the second light-emitting element and to cause the second light-emitting element to emit light at a second luminance. At some of gray scales, a gray scale value of the first data signal is smaller than a gray scale value of the second data signal.

APPENDIX

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

INDUSTRIAL APPLICABILITY

The disclosure can be utilized in a display and a driving method of a display.

The invention claimed is:

1. A driving method of a display including a first subpixel and a second subpixel constituting a pixel, a first light-emitting element constituting the first subpixel, a second light-emitting element constituting the second subpixel, a first drive unit configured to control a current density of a current flowing through the first light-emitting element, a second drive unit configured to control a current density of a current flowing through the second light-emitting element, and a controller configured to input a data signal to the first drive unit and the second drive unit, wherein each of the first light-emitting element and the second light-emitting element has element characteristics having, in a relationship between luminance and current density, a first region in which a luminance forms a downward convex shape, the controller causes a current of a first current density to flow into the first light-emitting element by inputting a data signal of a first gray scale value to the first drive unit and causes the first light-emitting element to emit light at a first luminance, the controller causes a current of a second current density to flow into the second light-emitting element by inputting a data signal of a second gray scale value to the second drive unit and causes the second light-emitting element to emit light at a second luminance, and when the first luminance and the second luminance are luminances included in the first region, the first gray scale value is smaller than the second gray scale value.

2. The driving method of the display according to claim 1, wherein when the data signal of the first gray scale value and the data signal of the second gray scale value are signals configured to average, in an area-weighted manner, a luminance of the first light-emitting element and a luminance of the second light-emitting element and to display the pixel at a desired luminance greater than a lowest gray scale, and in the element characteristics of each of the first light-emitting element and the second light-emitting element, when the luminance of the first light-emitting element and the luminance of the second light-emitting element are the luminances included in the first region, driving is performed to cause an area-weighted average of the first luminance and the second luminance to be equal to the desired luminance.

3. The driving method of the display according to claim 2, wherein a size of the first subpixel is from 0.95 times to 1.05 times a size of the second subpixel, and the element characteristics of the first light-emitting element and the element characteristics of the second light-emitting element are identical.

4. The driving method of the display according to claim 3, wherein the first current density is a current density included in the first region, and the second current density is a current density included in the first region.

5. The driving method of the display according to claim 3, wherein when, in the element characteristics of each of the first light-emitting element and the second light-emitting element, the luminance of the first light-emitting element and the luminance of the second light-emitting element are the luminances included in the first region, a maximum current density of the first region is set as a maximum drive current density, the luminance of the first light-emitting element is greater than 0 and smaller than half a luminance of the maximum drive current density, and the luminance of the second light-emitting element is greater than 0 and smaller than half the luminance of the maximum drive current density, the first current density is 0, and the second current density is a current density corresponding to a luminance twice as large as the desired luminance, in the element characteristics of the second light-emitting element.

6. The driving method of the display according to claim 3, wherein when, in the element characteristics of each of the first light-emitting element and the second light-emitting element, the luminance of the first light-emitting element and the luminance of the second light-emitting element are the luminances included in the first region, a maximum current density of the first region is set as a maximum drive current density, the luminance of the first light-emitting element is greater than half a luminance of the maximum drive current density and smaller than the luminance of the maximum drive current density, and the luminance of the second light-emitting element is greater than half the luminance of the maximum drive current density and smaller than the luminance of the maximum drive current density of the second light-emitting element, the second current density is the maximum drive current density, in the element characteristics of the second light-emitting element, and the first current density is a current density corresponding to a luminance obtained by subtracting the luminance of the maximum drive current density from a luminance twice as large as the desired luminance, in the element characteristics of the first light-emitting element.

7. The driving method of the display according to claim 2, wherein when the data signal of the first gray scale value and the data signal of the second gray scale value are signals configured to display the pixel at a luminance of the lowest gray scale, or the signals configured to average, in the area-weighted manner, the luminance of the first light-emitting element and the luminance of the second light-emitting element and to display the pixel at the desired luminance greater than the lowest gray scale, in the element characteristics of each of the first light-emitting element and the second light-emitting element, in addition to the first region, the element characteristics have a second region in which the luminance forms an upward convex shape and the luminance is higher than the luminance of the first region, and an inflection point present at a boundary between the first region and the second region, and the luminance of the first light-emitting element and the luminance of the second light-emitting element are luminances included in the second region, each of the current density of the current flowing through the first light-emitting element and the current density of the current flowing through the second light-emitting element is caused to be a third current density, and driving is performed to cause each of the luminance of the first light-emitting element corresponding to the third current density and the luminance of the second light-emitting element corresponding to the third current density to be equal to the desired luminance.

8. The driving method of the display according to claim 7, wherein when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is defined as a luminance ($L_D$) of a specific point, a luminance of the inflection point in the element characteristics of the first light-emitting element is equal to or greater than half the luminance of the specific point ($L_D/2$) in the element characteristics of the first light-emitting element, and a luminance of the inflection point in the element characteristics of the second light-emitting element is equal to or greater than half the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are the luminances included in the first region, the luminance of the first light-emitting element is greater than 0 and equal to or less than half the luminance of the specific point ($L_D/2$) in the element characteristics of the first light-emitting element, and the luminance of the second light-emitting element is greater than 0 and equal to or less than half the luminance of the specific point ($L_D/2$) in the element characteristics of the second light-emitting element, the first current density is 0, and the second current density is a current density corresponding to a luminance twice as large as the desired luminance, in the element characteristics of the second light-emitting element.

9. The driving method of the display according to claim 7, wherein when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is defined as a luminance ($L_D$) of a specific point, a luminance of the inflection point in the element characteristics of the first light-emitting element is equal to or greater than half of the luminance of the specific point ($L_D/2$) in the element characteristics of the first light-emitting element, and a luminance of the inflection point in the element characteristics of the second light-emitting element is equal to or greater than half of the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are the luminances included in the first region, the luminance of the first light-emitting element is greater than half of the luminance of the specific point ($L_D/2$) in the element characteristics of the first light-emitting element and equal to or less than the luminance of the inflection point in the element characteristics of the first light-emitting element, and the luminance of the second light-emitting element is greater than half of the luminance of the specific point ($L_D/2$) in the element characteristics of the second light-emitting element and equal to or less than the luminance of the inflection point in the element characteristics of the second light-emitting element, the first current density is a current density corresponding to a luminance obtained by subtracting a predetermined luminance ($L_X$) from the desired luminance, in the element characteristics of the first light-emitting element, and the second current density is a current density corresponding to a luminance obtained by adding the predetermined luminance ($L_X$) to the desired luminance, in the element characteristics of the second light-emitting element.

10. The driving method of the display according to claim 7, wherein when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is a luminance ($L_D$) of a specific point, a luminance of the inflection point in the element characteristics of the first light-emitting element is less than half the luminance of the specific point ($L_D/2$) in the element characteristics of the first light-emitting element, and a luminance of the inflection point in the element characteristics of the second light-emitting element is less than half the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are the luminances included in the first region, the luminance of the first light-emitting element is greater than 0 and less than the luminance of the inflection point, in the element characteristics of the first light-emitting element, and the luminance of the second light-emitting element is greater than 0 and less the luminance of the inflection point, in the element characteristics of the second light-emitting element, the first current density is 0, and the second current density is a current density corresponding to a luminance twice as large as the desired luminance, in the element characteristics of the second light-emitting element.

11. The driving method of the display according to claim 7, wherein when, in the element characteristics of the first light-emitting element and the element characteristics of the second light-emitting element, a second tangential line is present in the second region, the second tangential line having an inclination similar to an inclination of a first tangential line obtained when the luminance is 0 on a curved line indicating a relationship between the current density and the luminance, and a luminance corresponding to a point at which the curved line meets the second tangential line is defined as a luminance ($L_D$) of a specific point, a luminance of the inflection point in the element characteristics of the first light-emitting element is less than half the luminance of the specific point ($L_D/2$) in the element characteristics of the first light-emitting element, and a luminance of the inflection point in the element characteristics of the second light-emitting element is less than half the luminance of the specific point ($L_D/2$) in the element characteristics of the second light-emitting element, and when, in the element characteristics of each of the first light-emitting element and the second light-emitting element, the luminance of the first light-emitting element and the luminance of the second light-emitting element are luminances included in the second region, the luminance of the first light-emitting element is greater than the luminance of the inflection point in the element characteristics of the first light-emitting element and equal to or less than half the luminance of the specific point ($L_D/2$) in the element characteristics of the first light-emitting element, and the luminance of the second light-emitting element is greater than the luminance of the inflection point in the element characteristics of the second light-emitting element and equal to or less than half the luminance of the specific point ($L_D/2$) in the element characteristics of the second light-emitting element, the first current density is 0, and the second current density is a current density corresponding to a luminance twice as large as the desired luminance, in the element characteristics of the second light-emitting element.

12. The driving method of the display according to claim 7, wherein a size of the second subpixel is greater than a size of the first subpixel, a film thickness of an electron transport layer provided at the first light-emitting element is greater than a film thickness of an electron transport layer provided at the second light-emitting element, when, in the element characteristics of each of the first light-emitting element and the second light-emitting element, the luminance of the first light-emitting element and the luminance of the second light-emitting element are the luminances included in the first region, the luminance of the first light-emitting element is greater than 0 and equal to or less than half the luminance of the inflection point in the element characteristics of the first light-emitting element, and the luminance of the second light-emitting element is greater than 0 and equal to or less than half the luminance of the inflection point in the element characteristics of the second light-emitting element, the first current density is 0, and the second current density is a current density corresponding to a luminance twice as large as the luminance of the second light-emitting element, in the element characteristics of the second light-emitting element, and when the luminance of the first light-emitting element is greater than half the luminance of the inflection point in the element characteristics of the first light-emitting element and less than the luminance of the inflection point in the element characteristics of the first light-emitting element, and the luminance of the second light-emitting element is greater than half the luminance of the inflection point in the element characteristics of the second light-emitting element and less than the luminance of the inflection point in the element characteristics of the second light-emitting element, the first current density is a current density of the inflection point in the element characteristics of the first light-emitting element, and the second current density is a current density corresponding to a luminance obtained by subtracting the luminance of the inflection point in the element characteristics of the second light-emitting element from a luminance twice as large as the desired luminance in the element characteristics of the second light-emitting element.

13. The driving method of the display according to claim 1, wherein a size of the first subpixel and a size of the second subpixel are different, and the first current density and the second current density are determined to cause a current sum to be a minimum value, the current sum being obtained by combining a first value obtained by multiplying the first current density by the size of the first subpixel and a second value obtained by multiplying the second current density by the size of the second subpixel.

14. A display including a first subpixel and a second subpixel constituting a pixel, a first light-emitting element constituting the first subpixel, a second light-emitting element constituting the second subpixel, a first pixel circuit corresponding to the first subpixel, a second pixel circuit corresponding to the second subpixel, and a drive unit configured to supply a first data signal to the first pixel circuit and a second data signal to the second pixel circuit, wherein each of the first light-emitting element and the second light-emitting element has element characteristics having, in a relationship between luminance and current density, a first region in which a luminance forms a downward convex shape, a second region in which the luminance forms an upward convex shape and the luminance is higher than the luminance of the first region, and an inflection point present at a boundary between the first region and the second region, the first data signal is configured to cause a current of a first current density to flow through the first light-emitting element and to cause the first light-emitting element to emit light at a first luminance, the second data signal is configured to cause a current of a second current density to flow through the second light-emitting element and to cause the second light-emitting element to emit light at a second luminance, and at some of gray scales, a gray scale value of the first data signal is smaller than a gray scale value of the second data signal.

* * * * *